(12) United States Patent
Ikeda

(10) Patent No.: US 9,875,542 B2
(45) Date of Patent: Jan. 23, 2018

(54) CAMERA CALIBRATION DEVICE, CAMERA CALIBRATION METHOD, AND CAMERA CALIBRATION PROGRAM

(71) Applicant: Hiroo Ikeda, Tokyo (JP)

(72) Inventor: Hiroo Ikeda, Tokyo (JP)

(73) Assignee: NEC Corporation, Tokyo (JP)

( * ) Notice: Subject to any disclaimer, the term of this patent is extended or adjusted under 35 U.S.C. 154(b) by 189 days.

(21) Appl. No.: 14/373,726

(22) PCT Filed: Nov. 29, 2012

(86) PCT No.: PCT/JP2012/007655
§ 371 (c)(1),
(2) Date: Jul. 22, 2014

(87) PCT Pub. No.: WO2013/111229
PCT Pub. Date: Aug. 1, 2013

(65) Prior Publication Data
US 2015/0029345 A1    Jan. 29, 2015

(30) Foreign Application Priority Data
Jan. 23, 2012  (JP) .................. 2012-010640

(51) Int. Cl.
H04N 17/00 (2006.01)
G06T 7/00 (2017.01)
G06T 7/80 (2017.01)

(52) U.S. Cl.
CPC .............. *G06T 7/0018* (2013.01); *G06T 7/80* (2017.01); *H04N 17/002* (2013.01); *G06T 2207/10004* (2013.01); *G06T 2207/30244* (2013.01)

(58) Field of Classification Search
CPC .......... H04N 17/002; G06K 9/32; G06T 7/60;
G06T 7/0042; G06T 7/0018; G06T 6/0044; G06T 19/006; G06T 7/80; G06T 2207/10004; G06T 2207/30244
(Continued)

(56) References Cited

U.S. PATENT DOCUMENTS 5,227,985 A * 7/1993 DeMenthon ............... 702/153
2002/0024593 A1* 2/2002 Bouguet et al. ............. 348/46
(Continued)

FOREIGN PATENT DOCUMENTS

JP    2005-233846    9/2005
JP    2011-215082    10/2011

OTHER PUBLICATIONS

International Search Report corresponding to International Application No. PCT/JP2012/007655, dated Jan. 8, 2013.
(Continued)

*Primary Examiner* — Michael Lee
(74) *Attorney, Agent, or Firm* — Wilmer Cutler Pickering Hale & Dorr

(57) ABSTRACT

There is provided a camera calibration device capable of highly precisely and easily estimating camera parameters without installing a piece of special calibration equipment or measuring 3D coordinates of reference points employed for calibration. A normal vector acquisition unit acquires normal vectors perpendicular to a reference horizontal plane from an image of a camera to be calibrated. A rotation matrix estimation unit projects the acquired normal vectors on a projection virtual plane perpendicular to the reference horizontal plane and evaluates that the projected normal vectors are perpendicular to the reference horizontal plane thereby to estimate a rotation matrix employed for calibrating the camera.

18 Claims, 15 Drawing Sheets

(58) Field of Classification Search
USPC .......................................................... 348/187
See application file for complete search history.

(56) References Cited

U.S. PATENT DOCUMENTS

| | | | | |
|---|---|---|---|---|
| 2006/0095226 A1* | 5/2006 | Roh | ....................... | B25J 9/1692 702/150 |
| 2009/0169052 A1* | 7/2009 | Seki | ...................... | G06T 7/0044 382/103 |
| 2009/0245690 A1* | 10/2009 | Li et al. | ......................... | 382/285 |
| 2009/0290032 A1* | 11/2009 | Zhang et al. | .............. | 348/211.9 |
| 2010/0245592 A1* | 9/2010 | Inui et al. | ..................... | 348/187 |
| 2011/0205340 A1* | 8/2011 | Garcia | .................. | G01S 7/4972 348/46 |
| 2012/0062702 A1* | 3/2012 | Jiang et al. | ..................... | 348/46 |
| 2014/0098199 A1* | 4/2014 | Yeatman, Jr. | ......... | G06T 7/0075 348/48 |

OTHER PUBLICATIONS

Roger Y. Tsai, "An Efficient and Accurate Camera Calibration Technique for 3D Machine Vision", Proceedings of IEEE Conference on Computer Vision and Pattern Recognition, Miami Beach, FL, pp. 364-374, 1986.

Roger Y. Tsai, "A versatile Camera Calibration Technique for High-Accuracy 3D Machine Vision Metrology Using Off-the-Shelf TV Cameras and Lenses", IEEE Journal of Robotics and Automation, vol. 3, No. 4, pp. 323-344, 1987.

Gang Xu and Saburo Tsuji, "3D vision", Kyoritsu Shuppan Co., Ltd., ISBN 4-320-08522-1, pp. 79-82, 1998.

Z. Zhang, "A flexible new technique for camera calibration", IEEE Transactions on Pattern Analysis and Machine Intelligence, vol. 22, No. 11, pp. 1330-1334, 2000.

Extended European Search Report corresponding to European Application No. 12866684.9, dated Oct. 7, 2015, 8 pages.

Fengjun et al. "Camera Calibration from Video of a Walking Human", IEEE Transactions on Pattern Analysis and Machine Intelligence, IEEE Computer Society, USA, XP008093695, vol. 28, No. 9, Sep. 1, 2006, pp. 1513-1518.

Kusakunniran et al. "A Direct Method to Self-Calibrate a Surveillance Camera by Observing a Walking Pedestrian", Digital Image Computing Techniques and Applications, 2009, DICTA '09, XP031613840, IEEE, Piscataway, NJ, Dec. 1, 2009, pp. 250-255.

* cited by examiner

FIG. 2
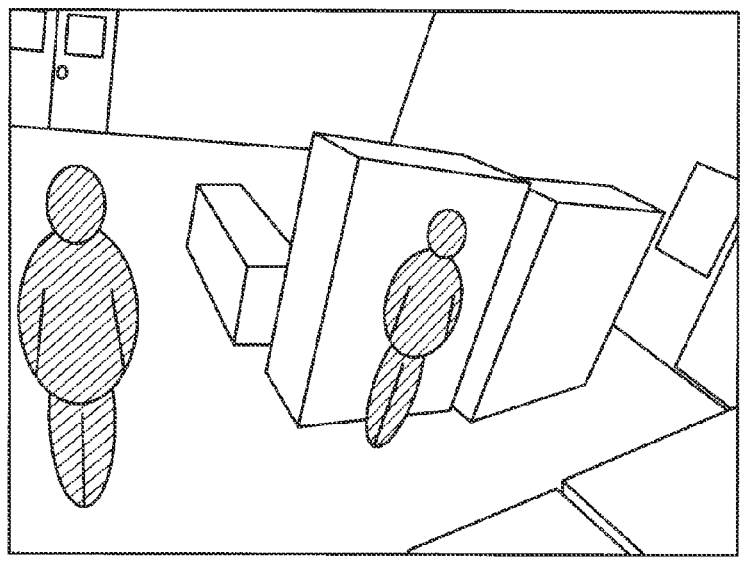
(a)
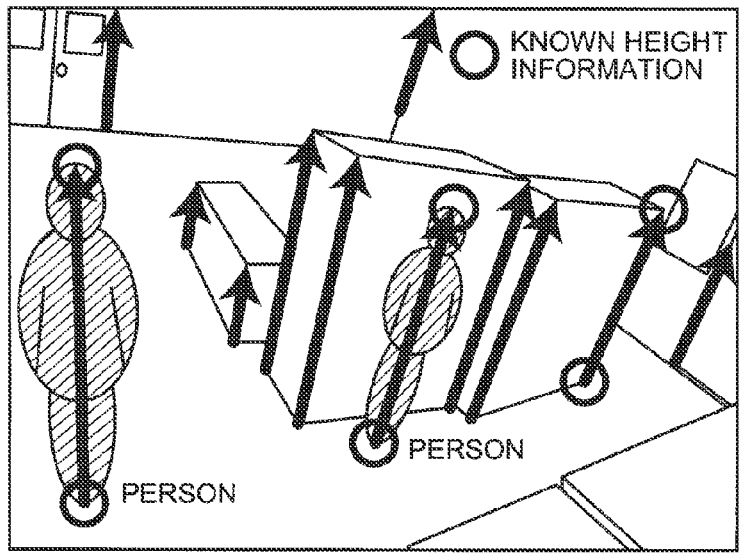
(b)

FIG. 4
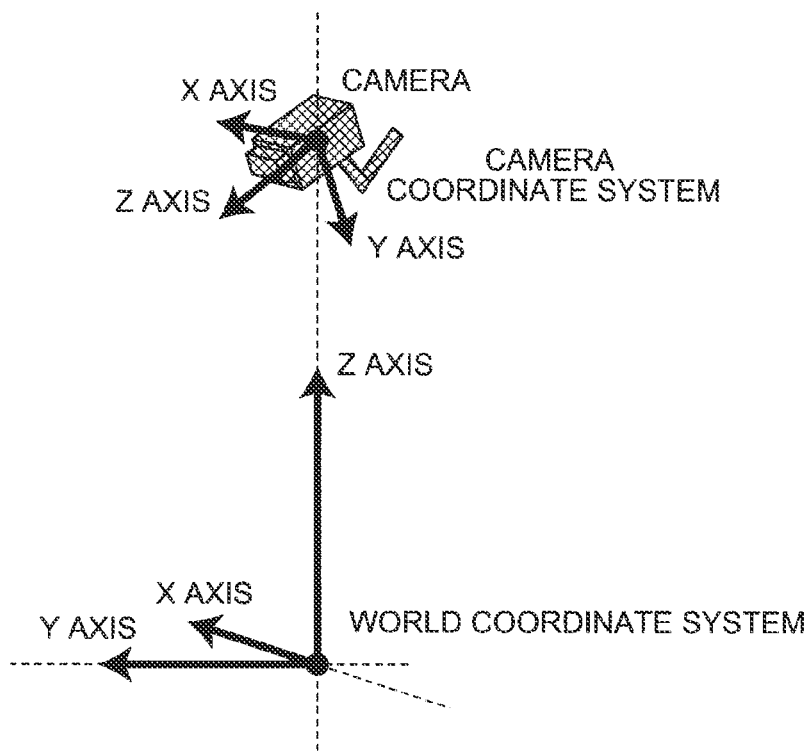
(a)
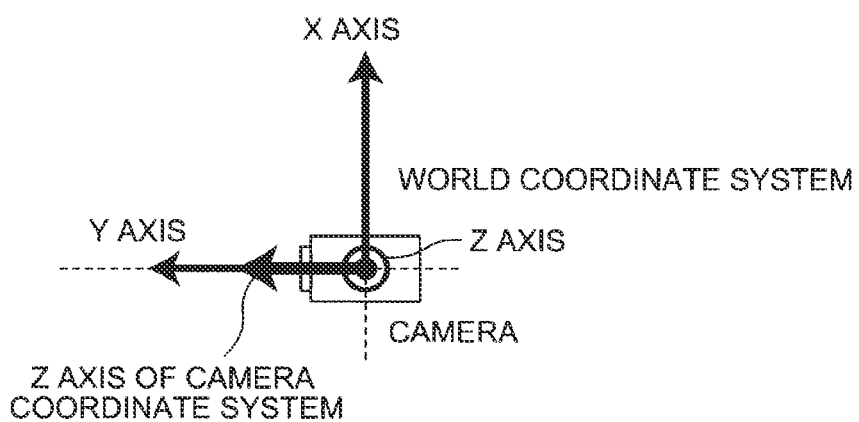
(b)

CAMERA CALIBRATION DEVICE, CAMERA CALIBRATION METHOD, AND CAMERA CALIBRATION PROGRAM

CROSS-REFERENCE TO RELATED APPLICATIONS

This application is a national stage application of International Application No. PCT/JP2012/007655 entitled "CAMERA CALIBRATION DEVICE, CAMERA CALIBRATION METHOD, AND CAMERA CALIBRATION PROGRAM" filed on Nov. 29, 2012, which claims the benefit of the priority of Japanese Patent Application No. 2012-010640, filed on Jan. 23, 2012, the disclosures of each of which are hereby incorporated by reference in their entirety.

TECHNICAL FIELD

The present invention relates to a camera calibration device for estimating camera parameters employed for calibrating a posture of a camera, a camera calibration method, and a camera calibration program.

BACKGROUND ART

There is known a camera calibration device for estimating camera parameters based on image information and real-space information in order to calibrate a posture of a camera. Such a camera calibration device estimates camera parameters (specifically, a rotation matrix and a translation matrix which indicate a posture of a camera) capable of conversion between 2D coordinates on an image and 3D coordinates in the real space. Exemplary camera calibration devices are described in Non-Patent Literatures 1 to 3.

The devices described in Non-Patent Literatures 1 to 3 are directed for estimating camera parameters based on reference points where a 2D coordinate on an image is associated with a 3D coordinate in the real space. At first, a piece of special calibration equipment with a known arrangement of reference points is installed in a field of view of a camera to be calibrated. The arrangement of reference points is known, and thus a positional relationship of the reference points in the real space is also known. Therefore, the above devices can acquire real-space 3D coordinates of the reference points.

Then, the camera calibration equipment is shot by the camera to be calibrated. The above devices acquire 2D coordinates on the image of the reference points from the shot image. The above devices make calculations based on projection equations thereby to estimate camera parameters by use of a correspondence between the 2D coordinates on the image of the acquired reference points and the 3D coordinates in the real space.

Non-Patent Literature 4 describes the Zhang method as an exemplary calibration method therein.

CITATION LIST

Non Patent Literatures

NPL 1: Roger Y. Tsai, "An Efficient and Accurate Camera Calibration Technique for 3D Machine Vision", Proceedings of IEEE Conference on Computer Vision and Pattern Recognition, Miami Beach, Fla., pp. 364-374, 1986

NPL 2: Roger Y. Tsai, "A versatile Camera Calibration Technique for High-Accuracy 3D Machine Vision Metrology Using Off-the-Shelf TV Cameras and Lenses", IEEE Journal of Robotics and Automation, Vol. 3, No. 4, pp. 323-344, 1987

NPL 3: Gang Xu and Saburo Tsuji, "3D vision", KYORITSU SHUPPAN CO., LTD., ISBN 4-320-08522-1, pp. 79-82, 1998

NPL 4: Z. Zhang, "A flexible new technique for camera calibration", IEEE Transactions on Pattern Analysis and Machine Intelligence, Vol. 22, No. 11, pp. 1330-1334, 2000

SUMMARY OF INVENTION

Technical Problem

However, by use of the typical devices described above, there is a problem that an accuracy of camera calibration lowers when many obstacles are present in the real space. This is because when a piece of special calibration equipment with a known arrangement of reference points, such as cube for calibration or lattice board for calibration, is installed, an installation place for the calibration equipment is restricted by the obstacles and the reference points cannot be evenly acquired from a shot image.

As much information on the entire screen as possible is required for precisely calibrating the camera. That is, reference points are not acquired only from part of the screen and reference points need to be acquired from everywhere on the screen. Further, when a piece of calibration equipment cannot be installed depending on a situation of obstacles, the camera cannot be calibrated.

By use of the typical devices described above, there is a problem that an accuracy of camera calibration lowers in a wide target real space. This is because a piece of practically-impossible large calibration equipment is required for acquiring reference points from everywhere on the screen in a wide real space.

Thus, the above problems can be solved by replacing reference points arranged for the calibration equipment with freely-arranged reference points (such as markers). With the freely-arranged reference points, however, there is a problem that easiness of camera calibration is lost.

This is because unlike when 3D coordinates of reference points can be easily acquired by use of a piece of calibration equipment with a known arrangement of reference points (or positional relationship between reference points), reference points are freely arranged and thus the 3D coordinates have to be measured one by one in the real space. In Particular, when a target real space is wide and complicated, the measurement of the 3D coordinates are very complicated.

It is therefore an exemplary object of the present invention to provide a camera calibration device capable of highly precisely and easily estimating camera parameters without installing a piece of special calibration equipment or measuring 3D coordinates of reference points employed for calibration, a camera calibration method, and a camera calibration program.

Solution to Problem

The camera calibration device according to the present invention includes a normal vector acquisition means which acquires normal vectors perpendicular to a reference horizontal plane from an image of a camera to be calibrated, and a rotation matrix estimation means which projects the acquired normal vectors on a projection virtual plane perpendicular to the reference horizontal plane and evaluates that the projected normal vectors are perpendicular to the reference horizontal plane thereby to estimate a rotation matrix employed for calibrating the camera.

The camera calibration method according to the present invention includes: acquiring normal vectors perpendicular to a reference horizontal plane from an image of a camera to be calibrated, projecting the acquired normal vectors on a projection virtual plane perpendicular to the reference horizontal plane, and evaluating that the projected normal vectors are perpendicular to the reference horizontal plane thereby to estimate a rotation matrix employed for calibrating the camera.

The camera calibration program according to the present invention causes a computer to perform a normal vector acquisition processing of acquiring normal vectors perpendicular to a reference horizontal plane from an image of a camera to be calibrated, and a rotation matrix estimation processing of projecting the acquired normal vectors on a projection virtual plane perpendicular to the reference horizontal plane and evaluating that the projected normal vectors are perpendicular to the reference horizontal plane thereby to estimate a rotation matrix employed for calibrating the camera.

Advantageous Effects of Invention

According to the present invention, it is possible to highly precisely and easily estimate camera parameters without installing a piece of special calibration equipment or measuring 3D coordinates of reference points employed for calibration.

BRIEF DESCRIPTION OF DRAWINGS

FIG. 2(a) It depicts an explanatory diagram illustrating exemplary normal vectors.

FIG. 2(b) It depicts an explanatory diagram illustrating exemplary normal vectors.

FIG. 4 It depicts an explanatory diagram illustrating an exemplary relationship between a camera coordinate system and a world coordinate system.

DESCRIPTION OF EMBODIMENTS

Exemplary embodiments according to the present invention will be described below with reference to the accompanying drawings.

First Exemplary Embodiment

Figure 1:
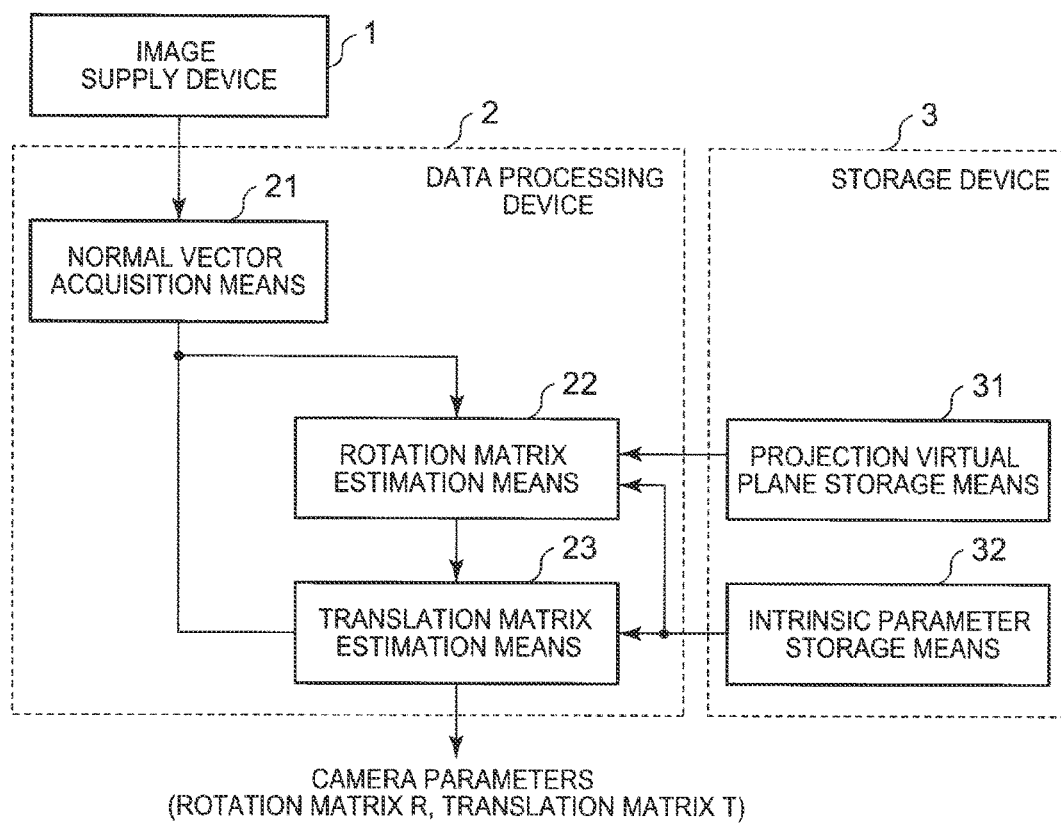
FIG. 1 It depicts a block diagram illustrating an exemplary structure of a camera calibration device according to a first exemplary embodiment of the present invention.

FIG. 1 is a block diagram illustrating an exemplary structure of a camera calibration device according to a first exemplary embodiment of the present invention. The camera calibration device according to the first exemplary embodiment includes an image supply device 1, a data processing device 2 operating under program control, and a storage device 3 for storing information therein.

The image supply device 1 supplies images of a camera to be calibrated. The image supply device 1 is realized by an image recording device such as video camera, digital camera, memory or hard disk, a computer, or the like. That is, the image supply device 1 may be any device capable of supplying images of a camera to be calibrated.

The storage device 3 includes a projection virtual plane storage means 31 and an intrinsic parameter storage means 32. The projection virtual plane storage means 31 stores therein information indicating a plane perpendicular to the ground (which will be denoted as projection virtual plane below). The ground described in the present specification means a reference horizontal plane perpendicular to the direction of gravity.

There will be described herein a relationship between the ground and a world coordinate system, and positioning a projection virtual plane in the world coordinate system. In the world coordinate system, the XY plane in the world coordinate system is set to be parallel with the ground, and the Z axis direction of the world coordinate system is set to be perpendicular to the ground. Therefore, the projection virtual plane is defined as a plane parallel to the Z axis direction of the world coordinate system.

The intrinsic parameter storage means 32 stores therein parameters (which will be denoted as intrinsic parameters below) such as a focal distance of a camera to be calibrated, a center position of an image, and a lens distortion coefficient. The intrinsic parameters are previously found by the Zhang method or the like described in Non-Patent Literature 4, for example, before the camera is installed. The method for finding an intrinsic parameter is not limited to the Zhang method. Any method capable of finding an intrinsic parameter may be employed.

The data processing device 2 includes a normal vector acquisition means 21, a rotation matrix estimation means 22, and a translation matrix estimation means 23.

The normal vector acquisition means 21 acquires normal vectors perpendicular to the ground from an image supplied from the image supply device 1. Further, the normal vector acquisition means 21 selects at least one normal vector from the acquired normal vectors. The normal vector acquisition means 21 acquires information on real-space heights of both of the end points (or two end points) of a selected normal vector (which will be denoted as height information below). The real-space height information is a value on the Z axis in the world coordinate system, for example.

Thereby, the normal vector acquisition means 21 can acquire two types of normal vectors including normal vectors with unknown height information and normal vectors with known height information.

The normal vector acquisition means 21 may acquire normal vectors from not one image but a plurality of images or animations. The normal vector acquisition means 21 may acquire normal vectors from each of a plurality of images (animations) shot by a fixed camera, and may assume the superimposed normal vectors as information on all the normal vectors.

The normal vector acquisition means 21 may acquire a part designated by a user or the like as a normal vector for an artificial object such as desk, shelf or building shot in an image. In terms of a person or pedestrian standing in an image, the normal vector acquisition means 21 may acquire a straight line connecting the head position and the foot position of the person designated by the user or the like as a normal vector. Further, the normal vector acquisition means 21 may acquire normal vectors by an image processing such as a straight line detection method by Hough transform or a method for detecting the head or foot.

The normal vector may be any line segment perpendicular to the ground. The normal vector acquisition method may employ any methods including the above methods. FIGS. 2(*a*) and 2(*b*) are the explanatory diagrams illustrating exemplary normal vectors. When an image illustrated in FIG. 2(*a*) is present, line segments illustrated in arrows in FIG. 2(*b*) are normal vectors. The normal vectors both ends of which are surrounded by circles, which are illustrated in FIG. 2(*b*), indicate normal vectors with known height information.

There will be described below how the normal vector acquisition means 21 acquires height information. The real-space height information indicting the end points of a normal vector can be acquired when the height information on an object, on which acquisition of a normal vector is based, is known. 3D information other than the height information is not required (that is, the coordinate on the ground is not required) for acquiring the height information on a normal vector. Thus, the normal vector acquisition means 21 can easily acquire the height information. The normal vector acquisition means 21 can automatically acquire many normal vectors with known height information from animations indicating a motion state in which a person whose height is known is moving.

For example, it is assumed that the original point of the world coordinate system is set to be as high as the ground. In this case, the real-space height information on the head position of a person is equal to the information on a known height. The real-space height information on the foot position of the person indicates 0. In such a situation, the normal vector acquisition means 21 can acquire a normal vector with known height information on the head position and the foot position. Also in this case, the normal vector acquisition means 21 can automatically acquire many normal vectors with known height information from an animation indicating a motion state in which a person whose height is known is moving.

Other methods for acquiring a normal vector with known height information may be employed. For example, a measurement medium (such as measure) used for measuring height information is previously installed in a specific space in a shooting space. Then, the image supply device 1 can acquire height information on the head position and the foot position of a moving medium (person) when shooting a passage state in which the moving medium (such as person) passes in a specific space.

That is, when the image supply device 1 supplies, to the normal vector acquisition means 21, an animation shooting therein a motion state in which a person is moving in a shooting space and a passage state in which a person passes at a position where height information can be acquired by a measurement medium, the normal vector acquisition means 21 can automatically acquire many normal vectors with known height information on the head position and the foot position by tracing the person from the animation.

The rotation matrix estimation means 22 projects the normal vectors acquired by the normal vector acquisition means 21 on a projection virtual plane perpendicular to a reference horizontal plane (or the ground). Then, the rotation matrix estimation means 22 evaluates a nature that the projected normal vectors are perpendicular to the reference horizontal plane (or the ground), thereby estimating a rotation matrix. Herein, to evaluate a vertical nature is to determine how much the normal vectors projected in the real space (projection virtual plane) are perpendicular. The vertical nature may be denoted as verticality below.

Specifically, the rotation matrix estimation means 22 projects the normal vectors acquired by the normal vector acquisition means 21 on the projection virtual plane stored in the projection virtual plane storage means 31 by use of the intrinsic parameters stored in the intrinsic parameter storage means 32 and the camera parameters indicating a posture of the camera. Then, the rotation matrix estimation means 22 evaluates verticality of the projected normal vectors on the ground and optimizes a rotation matrix R indicating a posture of the camera thereby to estimate the rotation matrix R.

There will be described below how the rotation matrix estimation means 22 estimates a rotation matrix. A relationship in Equation 1 is established between the world coordinate system and the camera coordinate system. A posture of the camera is expressed by a rotation matrix R (R is a 3×3 matrix) and a transitional matrix T (T is a 3×1 matrix) in Equation 1. The rotation matrix R expresses a direction of the camera and the transitional matrix T expresses a position of the camera. Information on a direction of the camera expressed by the rotation matrix R is denoted as directional information below. Information on a position of the camera expressed by the transitional matrix T is denoted as positional information.

[Mathematical Formula 1]

$$M_c = RM_w + T \qquad \text{(Equation 1)}$$

Figure 3:
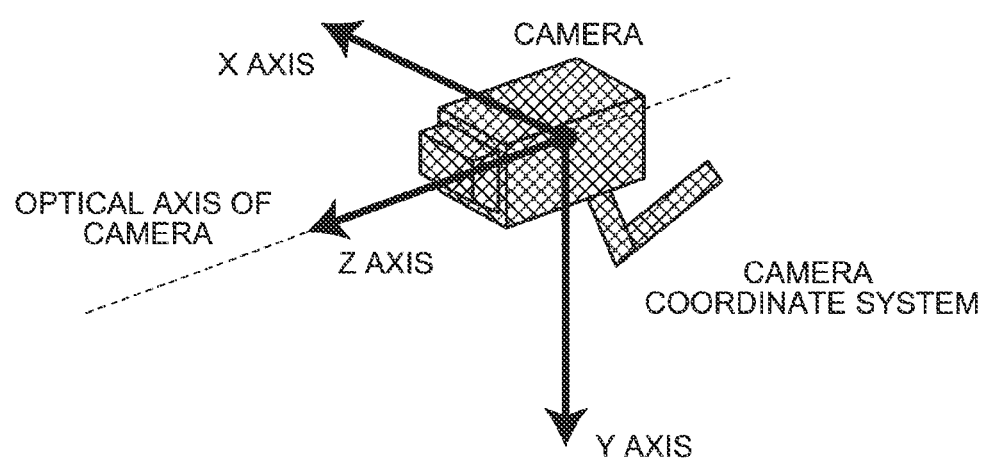
FIG. 3 It depicts an explanatory diagram illustrating an exemplary camera coordinate system.

Herein, $M_w$ indicates a world coordinate system (real-space coordinate system) ($M_w = [X_w, Y_w, Z_w]^t$). Mc indicates a camera coordinate system ($M_c = [X_c, Y_c, Z_c]^t$). The camera coordinate system is a coordinate system in which an optical axis of the camera is adjusted to the Z axis. FIG. 3 is an explanatory diagram illustrating an exemplary camera coordinate system. As illustrated in FIG. 3, the optical axis direction of the camera corresponds to the Z axis in the camera coordinate system.

Assuming a pinhole camera model, a relationship in Equation 2 is established between the camera coordinate system and the image coordinate system.

[Mathematical Formula 2]

$$sm = AM_c \quad \text{(Equation 2)}$$

Herein, m indicated an image coordinate system (m=[x, y, 1]$^t$). s indicates a scalar quantity. A is a 3×3 camera intrinsic matrix which indicates an intrinsic parameter. The intrinsic parameter A is set by an intrinsic parameter stored in the intrinsic parameter storage means 32.

The image coordinate and the world coordinate are inter-convertible by use of Equation 1 and Equation 2. According to the present exemplary embodiment, a positional restriction is imposed on the camera coordinate system and the world coordinate system when a camera parameter is estimated. The restriction is directed for setting the original point of the world coordinate system immediately below a position of the camera.

FIGS. 4(a) and 4(b) are the explanatory diagrams illustrating an exemplary relationship between the camera coordinate system and the world coordinate system. That is, as illustrated in FIG. 4(a), it is assumed that the original point of the camera coordinate system is present on the Z axis of the world coordinate system. On the assumption, a position of the camera can be expressed in 1D of the Z axis of the world coordinate system. On the assumption, a transitional matrix T indicating the positional information on the camera can be expressed in an 1D parameter.

Further, a restriction is imposed also on directions (rotations) between the camera coordinate system and the world coordinate system. FIG. 4(b) is an explanatory diagram illustrating the example viewed in a direction toward the Z axis of the world coordinate system. As illustrated in FIG. 4(b), the restriction is directed for adjusting the directions of the Y axis of the world coordinate system and the Z axis of the camera coordinate system when viewed in a direction toward the Z axis of the world coordinate system. That is, the yaw rotation is fixed at 0 degree in a direction (rotation) of the camera.

The yaw rotation is fixed at 0 degree so that a normal vector is present in the positive direction of the Y axis in the world coordinate system. Thereby, a direction (rotation) of the camera can be expressed in 2D by roll rotation and pitch rotation. Further, a rotation matrix R indicating posture information on the camera can be expressed in 2D parameters.

Figure 5:
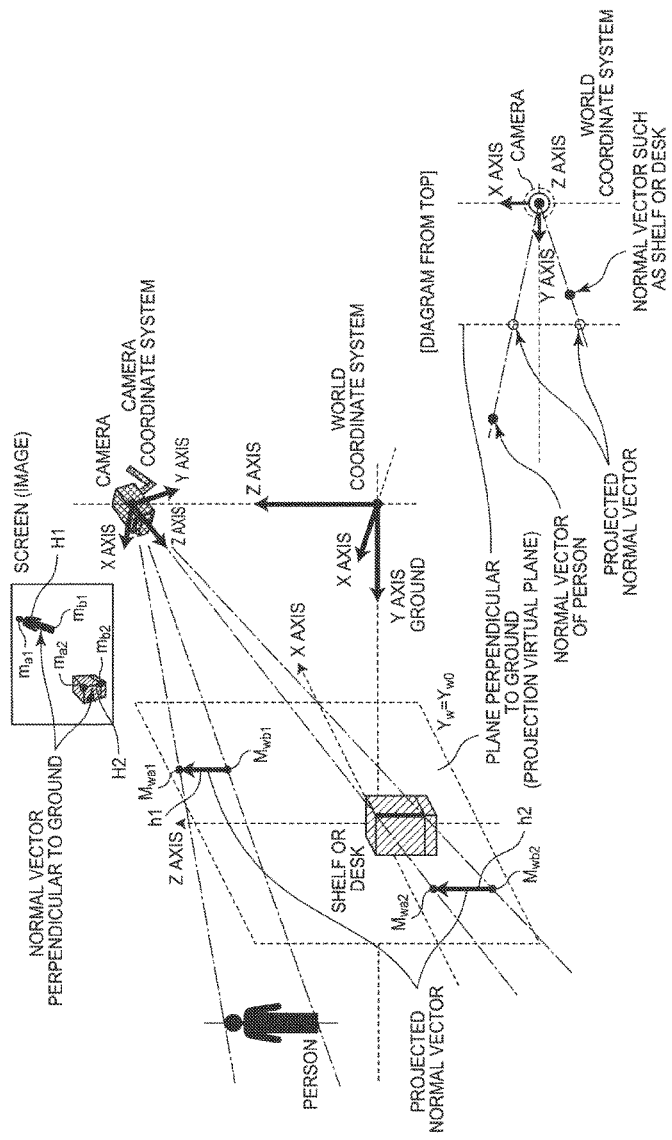
FIG. 5 It depicts an explanatory diagram illustrating an exemplary method for estimating a rotation matrix.

FIG. 5 is an explanatory diagram illustrating an exemplary method for estimating a rotation matrix R. The following nature is employed for estimating a rotation matrix R. At first, it is assumed that a direction (rotation matrix) of the camera is correct. In this case, as illustrated in FIG. 5, when the normal vectors H1 and H2 relative to the ground acquired on an image are projected on a projection virtual plane perpendicular to the ground, the projected normal vectors h1 and h2 indicate the nature that they are perpendicular to the ground. The nature depends on only a rotation matrix, and does not depend on a translation matrix.

In the following description, there will be described an estimation method when the original point of the world coordinate system is set on the ground and a projection virtual face is set as a plane parallel to the XZ plane of the world coordinate system. That is, a collection of positions where the Y coordinate of the world coordinate system is fixed ($Y_w = Y_{w0}$) is assumed as a projection virtual plane. Estimating a rotation matrix R does not depend on a translation matrix due to the above nature, and thus the original point of the camera coordinate system is set at the original point of the world coordinate system.

A specific method for estimating a rotation matrix R will be described on the above assumption. At first, the rotation matrix estimation means 22 projects the normal vectors acquired by the normal vector acquisition means 21 on a projection virtual plane perpendicular to the ground stored in the projection virtual plane storage means 31.

That is, as illustrated in FIG. 5, the rotation matrix estimation means 22 finds the points ($M_{wai} = [X_{wai}, Y_{w0}, Z_{wai}]^t$ and $M_{wbi} = [X_{wbi}, Y_{w0}, Z_{wbi}]^t$) on the projection virtual plane corresponding to the two end points ($m_{ai} = [x_{ai}, y_{ai}, 1]^t$ and $m_{bi} = [x_{bi}, y_{bi}, 1]^t$) of a normal vector on an image by use of Equation 1, Equation 2, the Y coordinate ($=Y_{w0}$) of the world coordinate system indicating the projection virtual plane, and $T = [0, 0, 0]^t$. Estimating a rotation matrix R does not depend on a translation matrix T, and thus T=0 is assumed. i indicates the number of a normal vector.

Then, the rotation matrix estimation means 22 evaluates verticality of the projected normal vectors relative to the ground based on the above nature, and estimates a rotation matrix R. An evaluation index indicated in Equation 3 is employed for evaluation. The evaluation index indicated in equation 3 is an index which approaches 0 when the projected normal vector is perpendicular to the ground. The rotation matrix estimation means 22 optimizes a rotation matrix R such that the evaluation index is minimum, thereby estimating the rotation matrix R. The rotation matrix estimation means 22 may employ any method known as an optimization method such as steepest descent method as a method for optimizing a rotation matrix R.

[Mathematical Formula 3]

$$\hat{R} = \underset{R}{\mathrm{argmin}}\left(\sum_{i=1}^{n} W_i (X_{wai}(R) - X_{wbi}(R))^2\right) \quad \text{(Equation 3)}$$

In Equation 3, $W_i$ indicates a weight on a normal vector, and n indicates the number of normal vectors. The weighting methods include the methods for increasing a weight of a normal vector in an area which requires a real-space accuracy, increasing a weight of a normal vector at the center of an image where stable conversion with less lens distortion is possible, increasing a weight as a normal vector is longer, and the like. Other methods may be employed for weighting depending on application.

As in Equation 4, a rotation matrix R may be expressed in 3D parameters by use of Z axis rotation $\theta_z$, Y axis rotation $\theta_y$, and X axis rotation $\theta_x$.

[Mathematical Formula 4]

$$R = \begin{bmatrix} \cos\theta_z & -\sin\theta_z & 0 \\ \sin\theta_z & \cos\theta_z & 0 \\ 0 & 0 & 1 \end{bmatrix} \begin{bmatrix} \cos\theta_y & 0 & \sin\theta_y \\ 0 & 1 & 0 \\ -\sin\theta_y & 0 & \cos\theta_y \end{bmatrix} \begin{bmatrix} 1 & 0 & 0 \\ 0 & \cos\theta_x & -\sin\theta_x \\ 0 & \sin\theta_x & \cos\theta_x \end{bmatrix} \quad \text{(Equation 4)}$$

Figure 6:
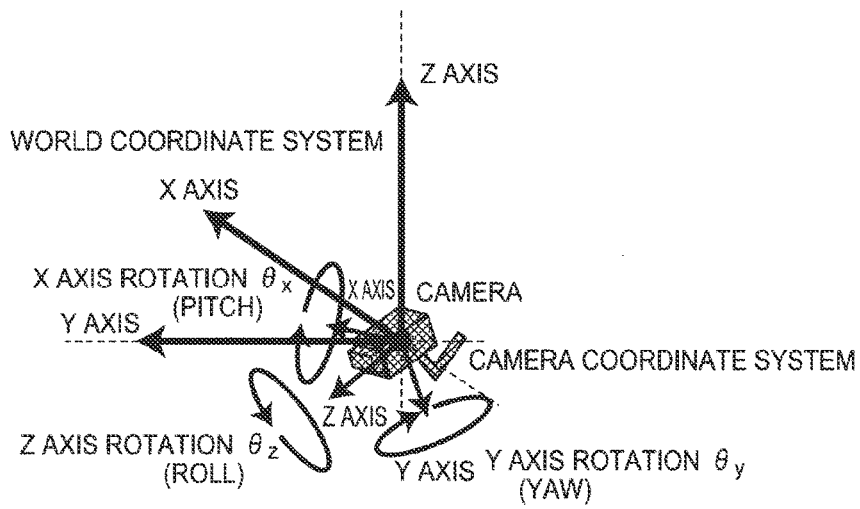
FIG. 6 It depicts an explanatory diagram illustrating an exemplary relationship between an axial rotation of a rotation matrix, and roll, pitch and yaw rotations of a camera.

FIG. 6 is an explanatory diagram illustrating an exemplary relationship between an axial rotation of a rotation matrix R, and the roll, pitch and yaw rotations of the camera. When the original point of the camera coordinate system is set at the original point of the world coordinate system, the rotation matrix R is, as illustrated in FIG. 6, such that the Z axis rotation $\theta_z$ of R matches with the roll rotation of the camera, the X axis rotation $\theta_x$ of R matches with the pitch rotation of the camera, and the Y axis rotation $\theta_y$ of R matches with the yaw rotation of the camera.

On the above assumption, the yaw rotation of the camera is fixed at 0 when a rotation matrix R is estimated. Therefore, the Y axis rotation $\theta_y$ of the rotation matrix R is fixed at 0 degree. Thus, the rotation matrix estimation means 22 may estimate a rotation matrix R with the 2D parameters including the Z axis rotation $\theta_z$ (roll rotation) and the X axis rotation $\theta_x$ (pitch rotation).

An exemplary method for estimating a rotation matrix R has been described above. There has been described above the method in which Equation 3 is employed for calculating an evaluation index for estimating a rotation matrix R. If the nature that a projected normal vector is perpendicular to the ground can be evaluated, the rotation matrix estimation means 22 may employ any evaluation index other than the resultant index calculated in Equation 3.

The rotation matrix estimation means 22 can evaluate that a projected normal vector is perpendicular to the ground even with a method for evaluating a tilt of the projected normal vector relative to the Z axis of the world coordinate system. Equation 5 below indicates a method for calculating the evaluation index. The evaluation index calculated in Equation 5 approaches 0 as the projected normal vector is nearly perpendicular to the ground. Therefore, the rotation matrix estimation means 22 can employ the evaluation index in Equation 5 instead of the evaluation index in Equation 3 for estimating a rotation matrix R.

[Mathematical Formula 5]

$$\hat{R} = \underset{R}{\operatorname{argmin}}\left(\sum_{i=1}^{n} W_i(1 - \cos\theta_i(R))\right) \quad \text{(Equation 5)}$$

In Equation 5, $\theta_i$ indicates an angle formed between the Z axis of the world coordinate system and a projected normal vector, and $W_i$ indicates a weight on a normal vector. A dot product of a unit vector of the Z axis of the world coordinate system and a projected normal vector is used thereby to easily calculate a value of $\cos \theta_i$.

The weighting methods include the methods for increasing a weight on a normal vector in an area which requires a real-space accuracy, increasing a weight on a normal vector at the center of an image where stable conversion with less lens distortion is possible, increasing a weight as a normal vector is longer, and the like. Other methods may be employed for weighting depending on application.

The rotation matrix estimation means 22 may employ a cross product of a unit vector of the Z axis of the world coordinate system and a projected normal vector for an evaluation index for estimating a rotation matrix R. The rotation matrix estimation means 22 may evaluate a tilt of a projected normal vector relative to the Z axis of the world coordinate system even with the evaluation index. That is, it is evaluated that the projected normal vector is perpendicular to the ground.

When the normal vector acquisition means 21 automatically acquires normal vectors, many outliers are likely to be included therein. Thus, when estimating a rotation matrix, the rotation matrix estimation means 22 may make robust estimation such as RANSAC (Random sample consensus) thereby to enhance an estimation accuracy.

An exemplary method for estimating a rotation matrix R by use of RANSAC will be described below. At first, the rotation matrix estimation means 22 randomly samples m normal vectors from among n automatically acquired normal vectors. The rotation matrix estimation means 22 uses the m sampled normal vectors to estimate a rotation matrix R with an estimation method using Equation 3 or Equation 5.

Then, the rotation matrix estimation means 22 uses the estimated rotation matrix R to project all of n normal vectors on a projection virtual plane. Then, the rotation matrix estimation means 22 evaluates a tilt of each projected normal vector.

Evaluating a tilt of a normal vector indicates evaluating an error ($|X_{wai} - X_{wbi}|$) between the X coordinates of the end points of a projected normal vector, or evaluating an angle error (tilt) of a projected normal vector relative to the Z axis of the world coordinate system. That is, evaluating a tilt of a normal vector may be evaluating how much a projected normal vector is perpendicular.

The rotation matrix estimation means 22 measures the number of normal vectors whose errors are equal to or less than a threshold (that is, not outliers). Then, the rotation matrix estimation means 22 stores therein a rotation matrix R having a largest number of measured normal vectors.

The rotation matrix estimation means 22 tries the above processings (or estimating and evaluating a rotation matrix R) several times, and then uses a rotation matrix R having a largest number of normal vectors whose errors are equal to or less than a threshold, thereby to evaluate all the normal vectors again.

Then, the rotation matrix estimation means 22 extracts normal vectors whose errors are equal to or less than a threshold (that is, except outliers), and uses the extracted normal vectors to estimate a rotation matrix R with the above method. There has been described above the exemplary method for robustly estimating a rotation matrix R by use of RANSAC.

The translation matrix estimation means 23 estimates a translation matrix T based on an error indicating a deviation between a normal vector with known height information which is projected on a real-space 3D coordinate by use of the intrinsic parameters and the rotation matrix R, and a real-space vertical direction.

Specifically, the translation matrix estimation means 23 projects one end point of a normal vector with known height information acquired by the normal vector acquisition means 21 into the real space by use of the intrinsic parameters stored in the intrinsic parameter storage means 32 and the camera parameters including a rotation matrix R estimated by the rotation matrix estimation means 22. That is, the translation matrix estimation means 23 finds a 3D coordinate of one end point when projecting a normal vector on an image into the real space.

The translation matrix estimation means 23 uses the fact that two paired end points of a normal vector are different only in height information, thereby to acquire a 3D coordinate of the other end point paired with one projected end point, and to re-project the acquire 3D coordinate back on the image. The intrinsic parameters and the camera parameters including a rotation matrix R are used also for re-projecting 3D coordinates back on the image. In this way, the translation matrix estimation means 23 finds the other end point paired with one end point projected on the 3D coordinate as a re-projected point on the image.

The translation matrix estimation means 23 evaluates an error between the coordinate of the re-projected point and the coordinate of the other end point directly acquired from the image thereby to estimate a translation matrix T. Specifically, the translation matrix estimation means 23 optimizes a translation matrix T such that an error between the coordinate of the re-projected point and the coordinate of the other end point directly acquired from the image is minimum, thereby to estimate the translation matrix T.

Figure 7:
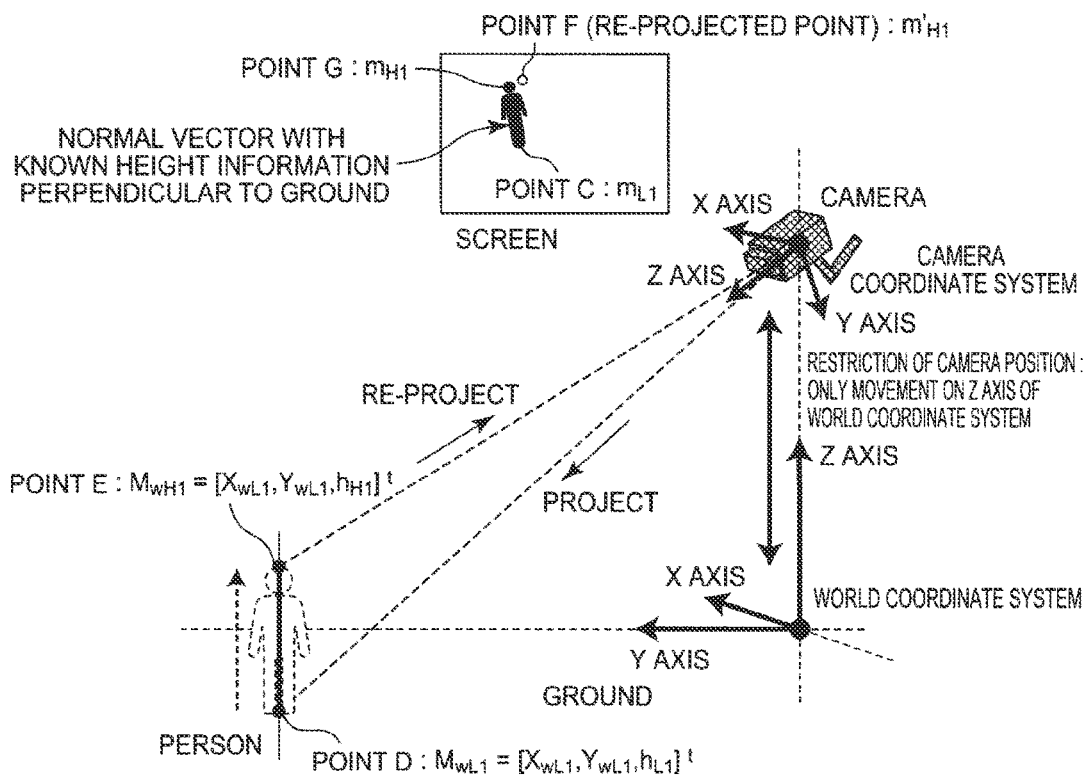
FIG. 7 It depicts an explanatory diagram illustrating an exemplary method for estimating a translation matrix.

There will be described below in detail how the translation matrix estimation means 23 estimates a translation matrix T. FIG. 7 is an explanatory diagram illustrating an exemplary method for estimating a translation matrix.

At first, the translation matrix estimation means 23 projects the coordinate $m_{Lj}=[x_{Lj}, y_{Lj}, 1]^t$ of the point C as one end point of a normal vector with known height information into the real space by use of the real-space height information of the end point (herein, the Z coordinate of the world coordinate system is assumed as $h_{Lj}$), Equation 1 and Equation 2. A rotation matrix R estimated by the rotation matrix estimation means 22 is employed for the rotation matrix R in Equation 1.

Specifically, the translation matrix estimation means 23 finds the coordinate $M_{wLj}=[X_{wLj}, Y_{wLj}, h_{Lj}]^t$ of the point D which is the point C projected on the 3D coordinate in the real space. Herein, j indicates the number of a normal vector with known height information.

Essentially, two paired end points of a normal vector are different only in height information in the real space. Thereby, the translation matrix estimation means 23 estimates the coordinate where the height $h_{Lj}$ of the 3D coordinate $M_{wLj}$ of the projected point (point D) is changed into the height information of an end point paired with the end point (the Z coordinate of the world coordinate system is $h_{Hj}$) as a coordinate of the other end point (point E). That is, the translation matrix estimation means 23 changes the height $h_{Lj}$ of the 3D coordinate $M_{wLj}$ of the projected end point into $h_{Hj}$, thereby finding the real-space 3D coordinate $M_{wHj}=[X_{wLj}, Y_{wLj}, h_{Hj}]^t$ of the end point (point E) paired with the end point (point D).

Further, the translation matrix estimation means 23 projects the real-space 3D coordinate $M_{wHj}$ of an end point (or the point E) paired with the end point on the image by use of Equation 1 and Equation 2, and finds the point as a re-projected point (point F) $m'_{Hj}=[x'_{Hj}, y'_{Hj}, 1]^t$. A rotation matrix R estimated by the rotation matrix estimation means 22 is employed for the rotation matrix R in Equation 1.

Essentially, if the employed camera parameters (R, T) are correct, the coordinate $m'_{Hj}$ of the end point (point F) paired with the end point (point C) found as a re-projected point is the same as the coordinate $m=[x_{Hj}, y_{Hj}, 1]^t$ of the end point (point G) directly acquired from the image. That is, $m'_{Hj}$ should match with $m_{Hj}$.

A rotation matrix R out of the camera parameters is estimated and fixed by the rotation matrix estimation means 22. Therefore, if the translation matrix T, which is the rest of the camera parameters, is correct, the coordinate $m'_{Hj}$ of the re-projected point will match with the coordinate $m_{Hj}$ of an end point paired with the end point directly acquired from the image.

Thus, the translation matrix estimation means 23 uses an evaluation index calculated in Equation 6 thereby to evaluate an error (which will be denoted as re-projection error) between the coordinate $m'_{Hj}$ of the re-projected point and the coordinate $m_{Hj}$ of an end point paired with the end point directly acquired from the image. Specifically, the translation matrix estimation means 23 optimizes a translation matrix T such that the re-projection error is minimum, thereby estimating the translation matrix T. The translation matrix estimation means 23 may employ a method known as optimization method such as steepest descent method as a method for optimizing a translation matrix T.

[Mathematical Formula 6]

$$\hat{T} = \underset{T}{\operatorname{argmin}} \left( \sum_{j=1}^{l} W'_j |m'_{Hj}(T) - m_{Hj}|^2 \right) \quad \text{(Equation 6)}$$

In Equation 6, $W'_j$ indicates a weight on a normal vector, and l indicates the number of normal vectors with known height information. For example, the weighting methods may include the methods for increasing a weight on a normal vector in an area which requires a real-space accuracy, increasing a weight of a normal vector at the center of an image where stable conversion with less lens distortion is possible, increasing a weight as a normal vector is longer, and the like. Other methods may be employed for weighting depending on application.

The translation matrix T is a 3D parameter. On the above assumption, a restriction that the original point of the camera coordinate system is installed on the Z axis of the world coordinate system is imposed on the positions of the camera coordinate system and the world coordinate system. Thus, the translation matrix T is expressed as an 1D parameter of the Z axis of the world coordinate system as in Equation 7. Therefore, the translation matrix estimation means 23 may estimate a translation matrix T with an 1D parameter of $Z_{wp}$.

[Mathematical Formula 7]

$$T = -RM_{wp} = -R \begin{bmatrix} 0 \\ 0 \\ Z_{wp} \end{bmatrix} \quad \text{(Equation 7)}$$

In Equation 7, $M_{wp}$ indicates a coordinate expressing the original point coordinate of the camera coordinate system by the world coordinate system. The translation matrix estimation means 23 may estimate a translation matrix T with a parameter search space limited to 1D ($Z_{wp}$). Therefore, searching can be easily made, and searching is possible even with less information employed for the searching. That is, there is obtained an advantage that estimations can be made even with a small number of normal vectors with known height information.

There has been described above how the translation matrix estimation means 23 projects one end of a normal vector in an image into the real space, calculates the other end point in the real space corresponding to the projected end point, and then re-projects the calculated other end point back on the image. There will be described below how the translation matrix estimation means 23 estimates a translation matrix T in other method.

The translation matrix estimation means 23 projects two end points of a normal vector with known height information acquired by the normal vector acquisition means 21 into the real space by use of the intrinsic parameters stored in the intrinsic parameter storage means 32 and the camera parameters including a rotation matrix R estimated by the rotation matrix estimation means 22. Thereby, the translation matrix estimation means 23 finds the 3D coordinates of the two end points when projecting a normal vector on the image into the real space.

Then, the translation matrix estimation means 23 excludes the height information from the two found 3D coordinates, respectively, thereby finding the 2D coordinates. The translation matrix estimation means 23 evaluates an error between the 2D coordinates of the two paired end points. Specifically, the translation matrix estimation means 23 optimizes a translation matrix T such that an error between the 2D coordinates of the two paired end points is minimum, thereby estimating the translation matrix T.

Figure 8:
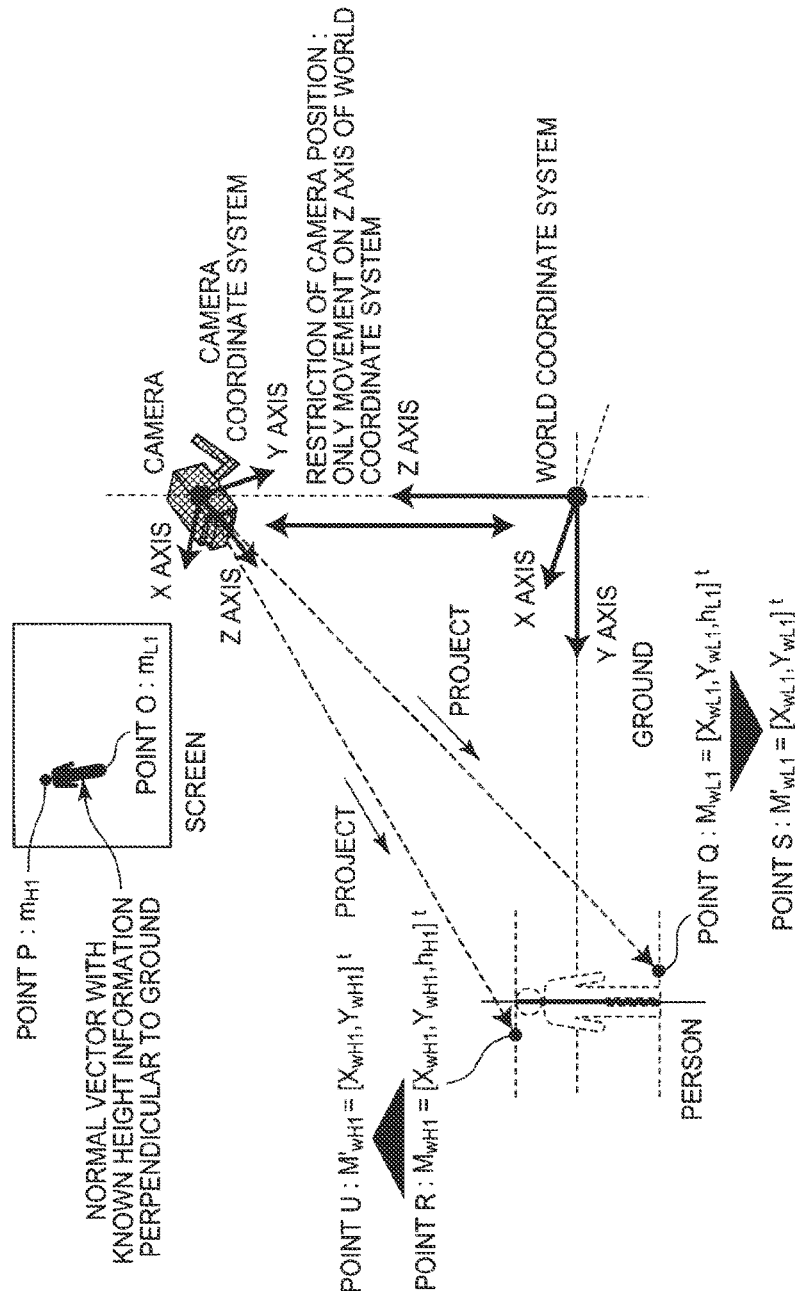
FIG. 8 It depicts an explanatory diagram illustrating other exemplary method for estimating a translation matrix.

There will be described below in detail how the translation matrix estimation means 23 estimates a translation matrix T. FIG. 8 is an explanatory diagram illustrating other exemplary method for estimating a translation matrix.

At first, the translation matrix estimation means 23 projects the coordinate $m_{Lj}=[x_{Lj}, y_{Lj}, 1]^t$ of the point O and the coordinate $m_{Hj}=[x_{Hj}, y_{Hj}, 1]^t$ of the point P, which are two end points of a normal vector with known height information, into the real space by use of the real-space height information of the end points (herein, the Z coordinate=$h_{Lj}$ of the world coordinate system corresponding to the point O and the Z coordinate=$h_{Hj}$ of the world coordinate system corresponding to the point P), Equation 1, and Equation 2. A rotation matrix R estimated by the rotation matrix estimation means 22 is employed for the rotation matrix R in Equation 1.

Specifically, the translation matrix estimation means 23 finds the coordinate $M_{wLj}=[X_{wLj}, Y_{wLj}, h_{Lj}]^t$ of the point Q which is the point O projected on a 3D coordinate in the real space, and the coordinate $M_{wHj}=[x_{wHj}, y_{wHj}, h_{Hj}]^t$ of the point R which is the point P projected on a 3D coordinate in the real space. j indicates the number of a normal vector with known height information.

Essentially, since a normal vector in the real space is perpendicular to the ground, if the employed camera parameters are correct, the 3D coordinates of two end points corresponding to the normal vector on the image should match therewith except height information.

The translation matrix estimation means 23 finds the 2D coordinates with height information excluded from the 3D coordinates $M_{wLj}$ and $M_{wHj}$ of the two found paired end points, respectively. Specifically, the translation matrix estimation means 23 finds the 2D coordinate $M'_{wLj}=[x_{wLj}, y_{wLj}]^t$ which is obtained by excluding the height information from the 3D coordinate $M_{wLj}$. The 2D coordinate $M'_{wLj}$ is assumed as the point S. Similarly, the translation matrix estimation means 23 finds the 2D coordinate $M'_{wHj}=[x_{wHj}, y_{wHj}]^t$ in which the height information is excluded from the 3D coordinate $M_{wHj}$. The 2D coordinate $M'_{wHj}$ is assumed as the point U.

The translation matrix estimation means 23 evaluates an error between the 2D coordinates $M'_{wLj}$ and $M'_{wHj}$ by use of an evaluation index calculated in Equation 8. Specifically, the translation matrix estimation means 23 optimizes a translation matrix T such that the error is minimum, thereby estimating the translation matrix T. The translation matrix estimation means 23 may employ a method known as an optimization method such as steepest descent method as a method for optimizing a translation matrix T.

[Mathematical Formula 8]

$$\hat{T} = \underset{T}{\operatorname{argmin}} \left( \sum_{j=1}^{l} W'_j |m'_{Hj}(T) - M'_{Lj}(T)|^2 \right) \quad \text{(Equation 8)}$$

In Equation 8, $W'_j$ indicates a weight on a normal vector, and l indicates the number of normal vectors with known height information. The weighting methods include the methods for increasing a weight on a normal vector in an area which requires a real-space accuracy, increasing a weight of a normal vector at the center of an image where stable conversion with less lens distortion is possible, increasing a weight as a normal vector is longer, and the like. Other methods may be employed for weighting depending on application. The translation matrix T is an 1D parameter as indicated in Equation 7 as described above.

The normal vector acquisition means 21, the rotation matrix estimation means 22 and the translation matrix estimation means 23 are realized by the CPU (Central Processing Unit) in a computer operating according to a program (camera calibration program). For example, the program is stored in a storage unit (not illustrated) in the camera calibration device, and the CPU may read the program and operate as the normal vector acquisition means 21, the rotation matrix estimation means 22 and the translation matrix estimation means 23 according to the program. The normal vector acquisition means 21, the rotation matrix estimation means 22 and the translation matrix estimation means 23 may be realized by dedicated hardware, respectively.

Figure 9:
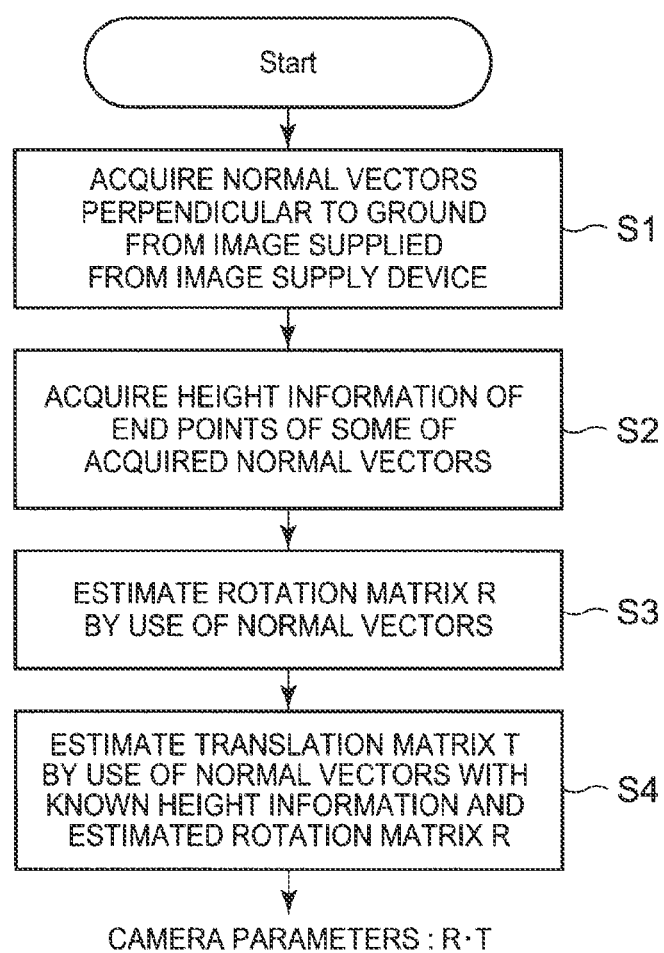
FIG. 9 It depicts a flowchart illustrating exemplary operations of the camera calibration device according to the first exemplary embodiment.

Exemplary operations of the camera calibration device according to the present exemplary embodiment will be described below. FIG. 9 is a flowchart illustrating exemplary operations of the camera calibration device according to the present exemplary embodiment. The image supply device 1 supplies images shot by a camera to be calibrated to the normal vector acquisition means 21.

The normal vector acquisition means 21 automatically or manually acquires normal vector perpendicular to the ground from artificial objects such as desk, shelf and building, or a person shot in an image supplied from the image supply device 1 (step S1).

Further, the normal vector acquisition means 21 acquires height information on real-space heights of the end points (two points) of a normal vector from an object with known height information forming the normal vector for some of the acquired normal vectors (step S2). The height information is a value of the Z axis in the world coordinate system, for example. 3D information other than height information is not required for an object employed for acquiring its height information.

The rotation matrix estimation means 22 estimates a rotation matrix R by use of normal vectors (step S3). Specifically, the rotation matrix estimation means 22 projects the normal vectors acquired by the normal vector acquisition means 21 on a projection virtual plane perpendicular to the ground stored in the projection virtual plane storage means 31 by use of the intrinsic parameters stored in the intrinsic parameter storage means 32 and the camera parameters expressing a posture of the camera. Then, the rotation matrix estimation means 22 evaluates verticality of the projected normal vectors relative to the ground and optimizes a rotation matrix R expressing a posture of the camera thereby to estimate the rotation matrix R.

Figure 10:
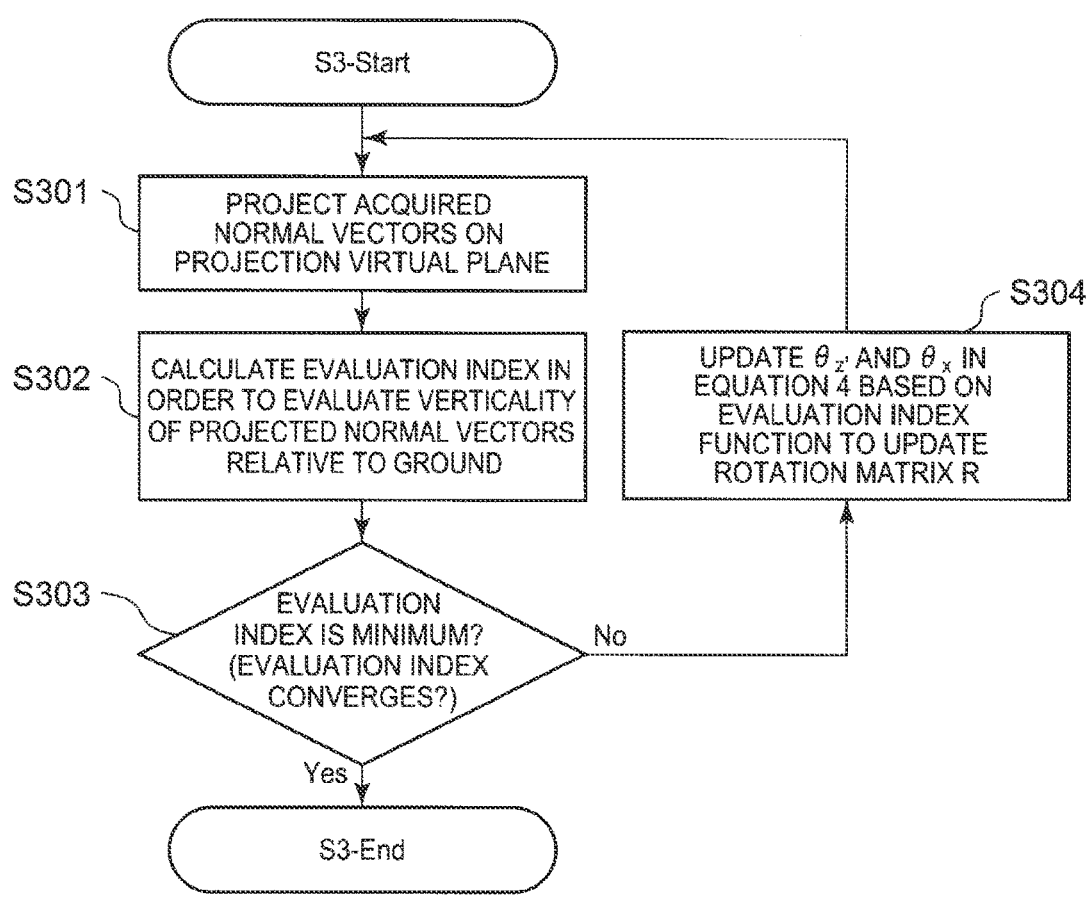
FIG. 10 It depicts a flowchart illustrating an exemplary processing of estimating a rotation matrix.

The processing in step S3 will be further described. FIG. 10 is a flowchart illustrating an exemplary processing of estimating a rotation matrix by the rotation matrix estimation means 22. The rotation matrix estimation means 22 projects the normal vectors acquired by the normal vector acquisition means 21 on the projection virtual plane perpendicular to the ground stored in the projection virtual plane storage means 31 by use of Equation 1, Equation, 2, the Y coordinate of the world coordinate system expressing the projection virtual plane, and the translation matrix T=[0, 0, 0]^T (step S301). Estimating a rotation matrix R does not depend on a translation matrix T, and thus T=0 is assumed.

Then, the rotation matrix estimation means 22 calculates an evaluation index by use of Equation 3 or Equation 5 in order to evaluate verticality of the projected normal vectors relative to the ground (step S302). Then, the rotation matrix estimation means 22 determines whether the calculated evaluation index is minimum (or the evaluation index converges) (step S303).

When the evaluation index is not minimum (does not converge) (No in step S303), the rotation matrix estimation means 22 updates the Z axis rotation $\theta_z$ and the X axis rotation $\theta_x$ in Equation 4 thereby to update the rotation matrix R (step S304) based on the tilt of the evaluation index function expressed in Equation 3 or Equation 5 (specifically, a function indicated in brackets in the latter part of argmin in Equation 3 or Equation 5), and repeats the processings in step S301 to step S303.

A typical optimization method is employed by the rotation matrix estimation means 22 for updating a rotation matrix R based on a tilt of an evaluation index function. The optimization methods may be steepest descent method, Newton method, conjugate gradient method, Gauss-Newton method, Levenberg-Marquardt method, or the like, but the optimization method is not limited to the above methods.

On the other hand, when the evaluation index is minimum (converges) (Yes in step S303), the rotation matrix estimation means 22 determines that the current rotation matrix R is an optimized value, and terminates the processing of estimating a rotation matrix R (or the processing in step S3 in FIG. 9).

Then, the translation matrix estimation means 23 estimates a translation matrix T by use of the normal vectors with known height information and the estimated rotation matrix R (step S4 in FIG. 9). Specifically, the translation matrix estimation means 23 projects one end point of a normal vector with known height information acquired by the normal vector acquisition means 21 into the real space by use of the intrinsic parameters stored in the intrinsic parameter storage means 32 and the camera parameters including the rotation matrix R estimated by the rotation matrix estimation means 22, thereby finding a 3D coordinate. Then, the translation matrix estimation means 23 calculates a real-space 3D coordinate of the other end point paired with one end point projected into the real space by use of the fact that the two paired end points of the normal vector are different only in the height information.

The translation matrix estimation means 23 re-projects the calculated real-space 3D coordinate of the other end point back on the image, thereby calculating the re-projected end point as a re-projected point paired with one end point on the image. The translation matrix estimation means 23 evaluates an error between the coordinate of the other end point paired with one end point directly acquired from the image and the coordinate of the re-projected end point. Specifically, the translation matrix estimation means 23 optimizes a translation matrix T expressing a posture of the camera such that the error is minimum, thereby estimating the translation matrix T.

Figure 11:
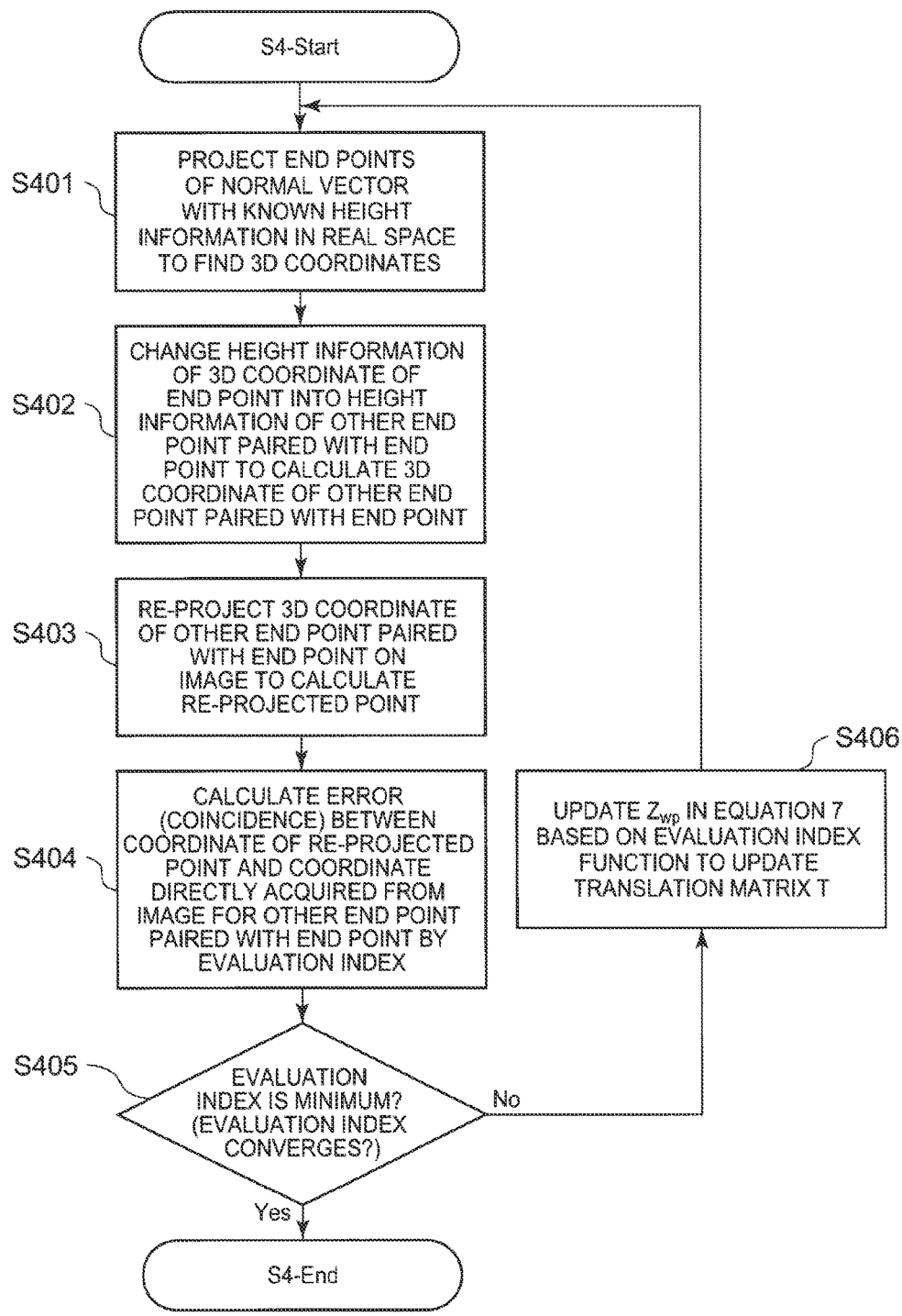
FIG. 11 It depicts a flowchart illustrating an exemplary processing of estimating a translation matrix.

The processing in step S4 will be further described. FIG. 11 is a flowchart illustrating an exemplary processing of estimating a translation matrix by the translation matrix estimation means 23.

The translation matrix estimation means 23 projects one end point of a normal vector with known height information acquired by the normal vector acquisition means 21 into the real space by use of the real-space height information of the end point, Equation 1 and Equation 2, thereby finding a 3D coordinate in the real space (step S401). Herein, a rotation matrix R estimated by the rotation matrix estimation means 22 is employed for the rotation matrix R in Equation 1.

Then, the translation matrix estimation means 23 changes the height information at the 3D coordinate of one projected end point into the height information at the other end point paired with one end point by use of the fact that the two paired end points of the normal vector are different only in the real-space height information, thereby calculating a real-space 3D coordinate of the other end point (step S402).

The translation matrix estimation means 23 re-projects the real-space 3D coordinate of the other end point paired with one end point on the image by use of Equation 1 and Equation 2, and calculates the re-projected end point as a re-projected point (step S403). Herein, a rotation matrix R estimated by the rotation matrix estimation means 22 is employed for the rotation matrix R in Equation 1.

The translation matrix estimation means 23 calculates an error between the coordinate of the end point calculated as a re-projected point and the coordinate of the other end point paired with one end point directly acquired from the image as an evaluation index by use of Equation 6 (step S404). The error indicates how much both match with each other, and thus the translation matrix estimation means 23 may evaluate a coincidence therebetween by use of Equation 6.

The translation matrix estimation means 23 determines whether the calculated evaluation index is minimum (or the evaluation index converges) (step S405). When the evaluation index is not minimum (does not converge) (No in step S405), the translation matrix estimation means 23 updates $Z_{wp}$ in Equation 7 based on a tilt of the evaluation index function thereby to update the translation matrix T (step S406), and repeats the processings in step S401 to step S405. A typical optimization method is employed by the translation matrix estimation means 23 for updating the translation matrix T based on a tilt of the evaluation index function.

On the other hand, when the evaluation index is minimum (converges) (Yes in step S405), the translation matrix estimation means 23 determines that the current translation matrix T is an optimized value, and terminates the processing of estimating a translation matrix T (or the processing in step S4 in FIG. 9).

Figure 12:
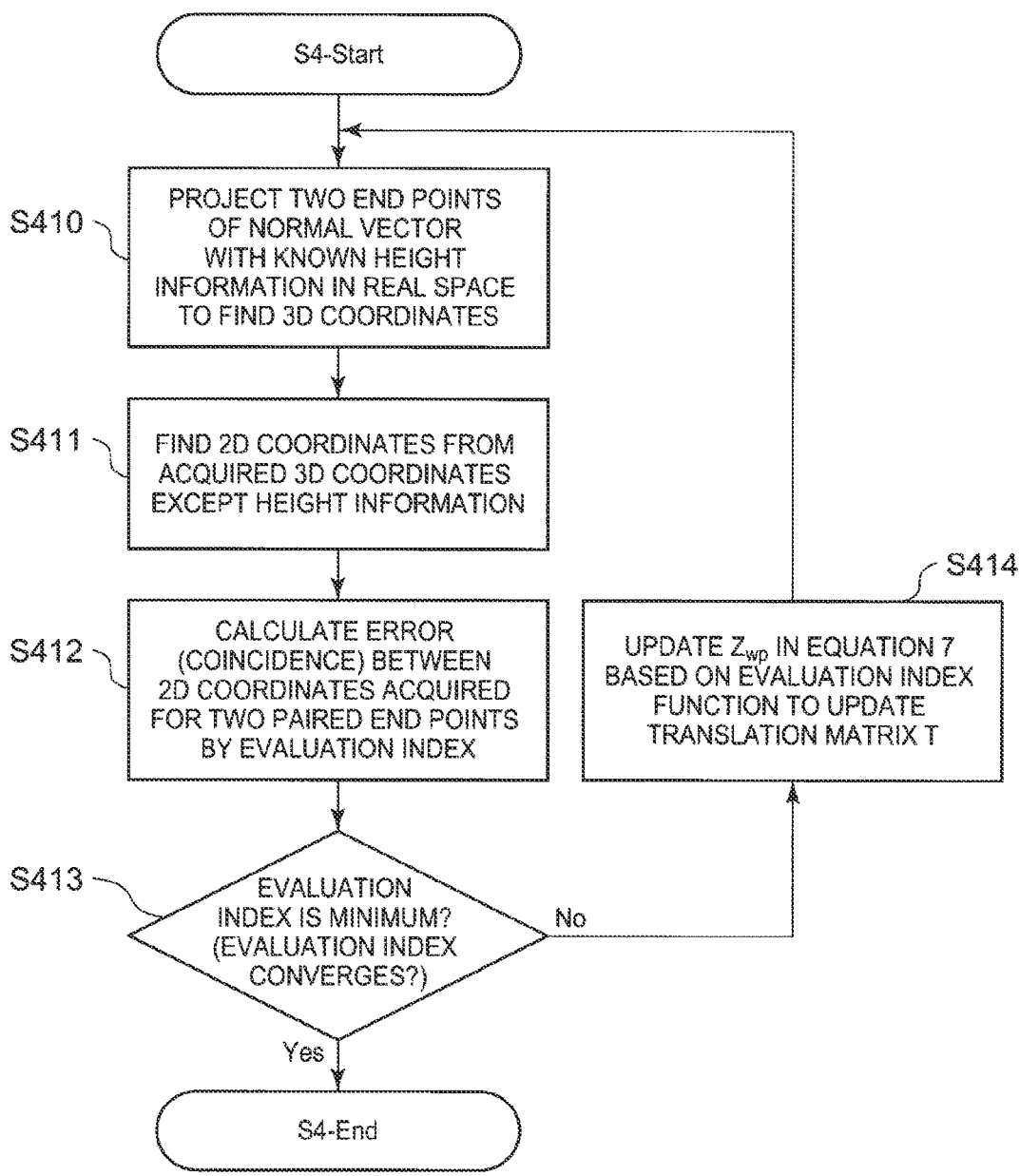
FIG. 12 It depicts a flowchart illustrating other exemplary processing of estimating a translation matrix.

The translation matrix estimation means 23 may estimate a translation matrix by performing the processings in step S410 to step S413 illustrated in FIG. 12 instead of the processings in step S401 to step S406 illustrated in FIG. 11. FIG. 12 is a flowchart illustrating other exemplary processing of estimating a translation matrix by the translation matrix estimation means 23.

As described above, in step S4 illustrated in FIG. 9, the translation matrix estimation means 23 estimates a translation matrix T by use of the normal vectors with known height information and an estimated rotation matrix R. Specifically, the translation matrix estimation means 23 projects two end points of a normal vector with known height information acquired by the normal vector acquisition means 21 into the real space by use of the intrinsic parameters stored in the intrinsic parameter storage means 32 and the camera parameters including a rotation matrix R estimated by the rotation matrix estimation means 22, thereby finding 3D coordinates. Then, the translation matrix estimation means 23 calculates 2D coordinates with the height information excluded from the 3D coordinates of the respective found end points, and evaluates an error between the 2D coordinates of the two paired end points. Specifically, the translation matrix estimation means 23 optimizes a translation matrix T expressing a posture of the camera such that the error is minimum, thereby estimating the translation matrix T.

The processing in step S4 will be further described. The translation matrix estimation means 23 projects two end points of a normal vector with known height information acquired by the normal vector acquisition means 21 into the real space by use of the real-space height information of the end points, Equation 1, and Equation 2, thereby finding real-space 3D coordinates of the two end points (step S410 in step S12). Herein, a rotation matrix R estimated by the rotation matrix estimation means 22 is employed for the rotation matrix R in Equation 1.

Then, the translation matrix estimation means 23 finds the 2D coordinates with the height information excluded from the 3D coordinates of the two found paired end points (step S411). The translation matrix estimation means 23 calculates an error between the 2D coordinates of the two paired end points as an evaluation index by use of Equation 8 (step S412). The error indicates a coincidence therebetween, and thus the translation matrix estimation means 23 may evaluate a coincidence therebetween by use of Equation 8.

The translation matrix estimation means 23 determines whether the calculated evaluation index is minimum (or the evaluation index converges) (step S413). When the evaluation index is not minimum (does not converge) (No in step S413), the translation matrix estimation means 23 updates $Z_{wp}$ in Equation 7 based on a tilt of the evaluation index function thereby to update a translation matrix T (step S414), and repeats the processings in step S410 to step S413. A typical optimization method is employed by the translation matrix estimation means 23 for updating a translation matrix T based on a tilt of the evaluation index function.

On the other hand, when the evaluation index is minimum (converges) (Yes in step S413), the translation matrix estimation means 23 determines that the current translation matrix T is an optimized value, and terminates the processing of estimating a translation matrix T (or the processing in step S4 in FIG. 9).

As described above, according to the first exemplary embodiment, the normal vector acquisition means 21 acquires normal vectors perpendicular to a reference horizontal plane from an image of a camera to be calibrated. The rotation matrix estimation means 22 projects the acquired normal vectors on a projection virtual plane perpendicular to the reference horizontal plane (or ground). Then, the rotation matrix estimation means 22 evaluates that the projected normal vectors are perpendicular to the reference horizontal plane, thereby estimating a rotation matrix R. Thus, the camera parameters can be highly precisely and easily estimated without installing a piece of special calibration equipment or measuring 3D coordinates of reference points employed for calibration.

The translation matrix estimation means 23 may estimate a translation matrix T based on an error indicating a deviation between a normal vector with known height information projected on a real-space 3D coordinate and the vertical direction in the real space by use of the intrinsic parameters and the rotation matrix R.

That is, according to the first exemplary embodiment, many normal vectors perpendicular to the ground, which are freely arranged and can be easily acquired from an image, are utilized. Specifically, according to the present exemplary embodiment, normal vectors, and some normal vectors with known real-space height information among the normal vectors are utilized. The normal vectors are information which does not need to measure 3D coordinates as coordinates on the ground. Then, according to the present exemplary embodiment, the camera parameters including a rotation matrix and a translation matrix are estimated while the number of dimensions is restricted, and thus the camera parameters can be highly precisely and easily estimated without installing a piece of special calibration equipment or measuring 3D coordinates of reference points employed for calibration. Further, according to the present exemplary embodiment, the camera parameters can be estimated even in a wide target real space.

According to the present exemplary embodiment, the rotation matrix estimation means 22 estimates a rotation matrix R by use of normal vectors and the nature that the normal vectors projected on a projection virtual plane perpendicular to the ground are perpendicular non irrespective of a translation matrix T. Many normal vectors can be easily acquired from an image and are perpendicular to the ground. Therefore, a translation matrix T is separated from the camera parameters, and only a rotation matrix R can be highly precisely estimated.

According to the present exemplary embodiment, the rotation matrix estimation means 22 highly precisely estimates a rotation matrix R by use of normal vectors, and then the translation matrix estimation means 23 estimates a translation matrix T as a remarkably-restricted 1D parameter by use of normal vectors with known real-space height information. Therefore, the camera parameters can be estimated even with less essentially-required height information in the real space.

According to the present exemplary embodiment, the rotation matrix estimation means 22 estimates camera parameters by restricting a rotation matrix R which is as low a dimension as 2D of the roll rotation and the pitch rotation of a camera (or narrowing a search range). Further, the translation matrix estimation means 23 makes an estimation by restricting a translation matrix T by as low a dimensional parameter as 1D of only motion of a camera position on the Z axis in the world coordinate system (or narrowing a search range). Further, for the processing of estimating camera parameters, the processing of estimating a translation matrix is performed after the processing of estimating a rotation matrix. That is, the estimation processings are independently performed in two stages. Therefore, estimating the camera parameter is not easily caused to a local solution, and the estimation processings can be fast performed.

According to the present exemplary embodiment, the camera parameters are estimated by use of only normal vectors perpendicular to the ground acquired from an image and some normal vectors with known real-space height information. Further, when the image supply device 1 shoots a pedestrian who is walking in front of a camera to be calibrated and whose height is known, the normal vector acquisition means 21 can acquire a large number of normal vectors connecting the head and the foot and normal vectors with known height information in the shot image. Therefore, the camera parameters can be estimated by use of only the normal vectors and many normal vectors required for the estimation can be acquired so that the camera parameters can be easily estimated.

Second Exemplary Embodiment

Figure 13:
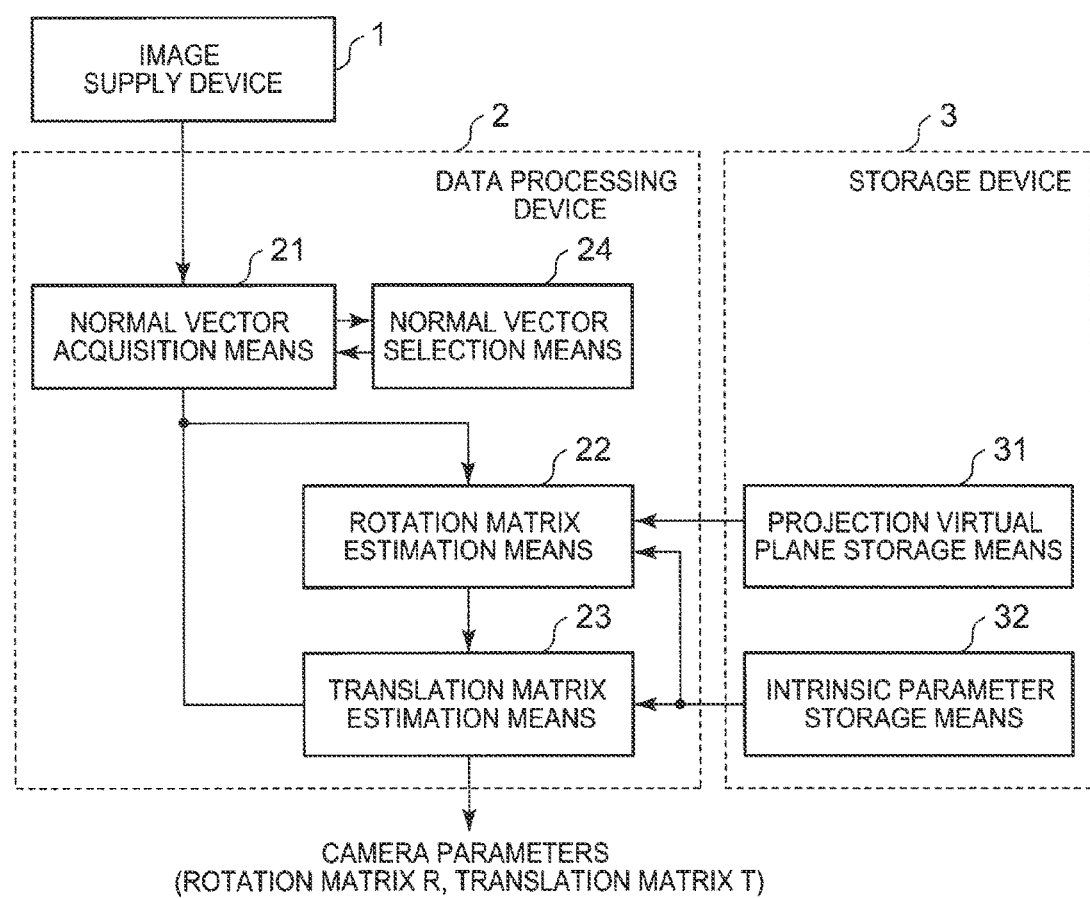
FIG. 13 It depicts a block diagram illustrating an exemplary structure of the camera calibration device according to a second exemplary embodiment of the present invention.

FIG. 13 is a block diagram illustrating an exemplary structure of the camera calibration device according to a second exemplary embodiment of the present invention. The same constituents as those in the first exemplary embodiment are denoted with the same reference numerals as in FIG. 1, and a description thereof will be omitted. As illustrated in FIG. 13, the camera calibration device according to the second exemplary embodiment of the present invention is configured such that the camera calibration device according to the first exemplary embodiment illustrated in FIG. 1 is added with a normal vector selection means 24.

The normal vector selection means 24 receives normal vectors perpendicular to the ground from the normal vector acquisition means 21. It is herein assumed that the normal vector acquisition means 21 notifies normal vectors including many errors to the normal vector selection means 24 since it automatically acquires the normal vectors, for example. The information to be notified by the normal vector acquisition means 21 is not limited to normal vectors. The normal vector acquisition means 21 may notify an image in which the normal vectors are to be specified to the normal vector selection means 24. The normal vector selection means 24 selects at least one correct normal vector from among the received normal vectors in response to a user's selection instruction.

The normal vector selection means 24 compares a selected correct normal vector with all the received normal vectors. The normal vector selection means 24 selects, as a normal vector effective for camera calibration, a normal vector whose tilt relative to the normal vector selected as a correct normal vector is within a threshold. Then, the normal vector selection means 24 notifies the selected normal vector back to the normal vector acquisition means 21.

The normal vector selection means 24 is realized by a computer including a display device for displaying normal vectors and an image notified from the normal vector acquisition means 21, an input device for receiving a user's selection instruction, or the like, for example.

Figure 14:
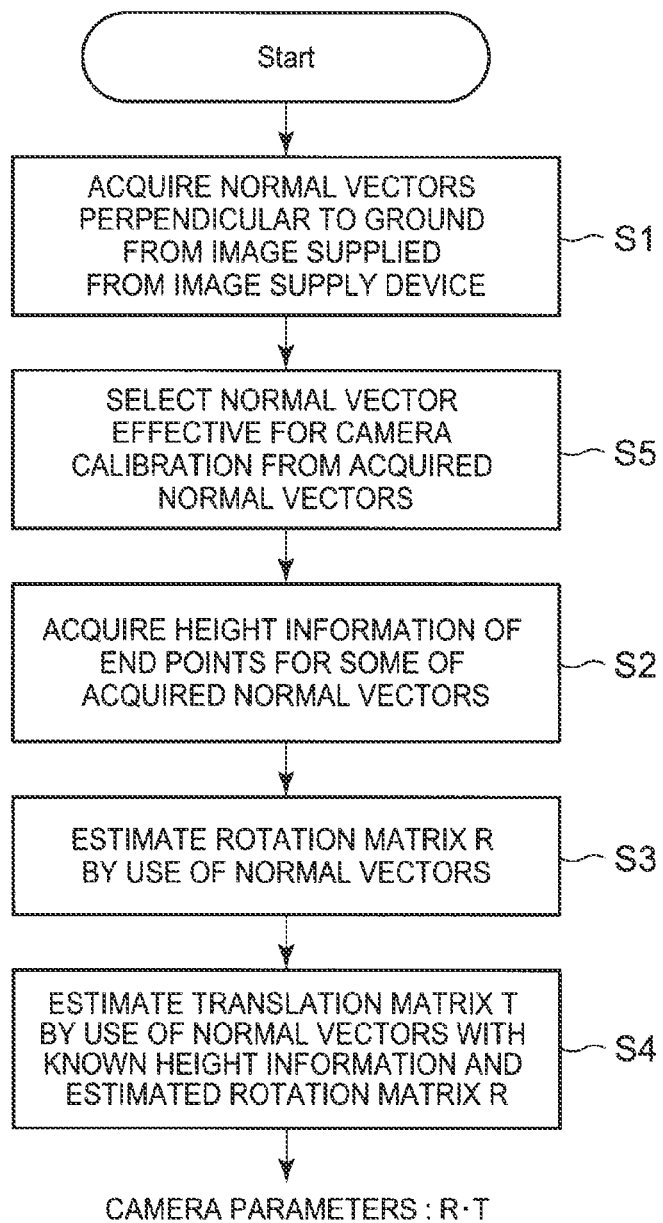
FIG. 14 It depicts a flowchart illustrating exemplary operations of the camera calibration device according to the second exemplary embodiment.

Exemplary operations of the camera calibration device according to the present exemplary embodiment will be described below. FIG. 14 is a flowchart illustrating exemplary operations of the camera calibration device according to the present exemplary embodiment. The operations of the camera calibration device according to the present exemplary embodiment are different from the operations of the camera calibration device according to the first exemplary embodiment in that new step S5 is added after step S1 in the flowchart illustrate in FIG. 9. The operations in step S1 to step S4 are the same as those in the first exemplary embodiment, and thus a description thereof will be omitted.

When an image of a camera to be calibrated is supplied from the image supply device 1 to the normal vector acquisition means 21 and the normal vector acquisition means 21 acquires normal vectors, the normal vector acquisition means 21 notifies the acquired normal vectors to the normal vector selection means 24.

The normal vector selection means 24 receives normal vectors perpendicular to the ground from the normal vector acquisition means 21. The normal vector selection means 24 selects a normal vector effective for camera calibration based on some user-selected correct normal vectors. Then, the normal vector selection means 24 notifies the selected normal vectors to the normal vector acquisition means 21 (step S5).

Figure 15:
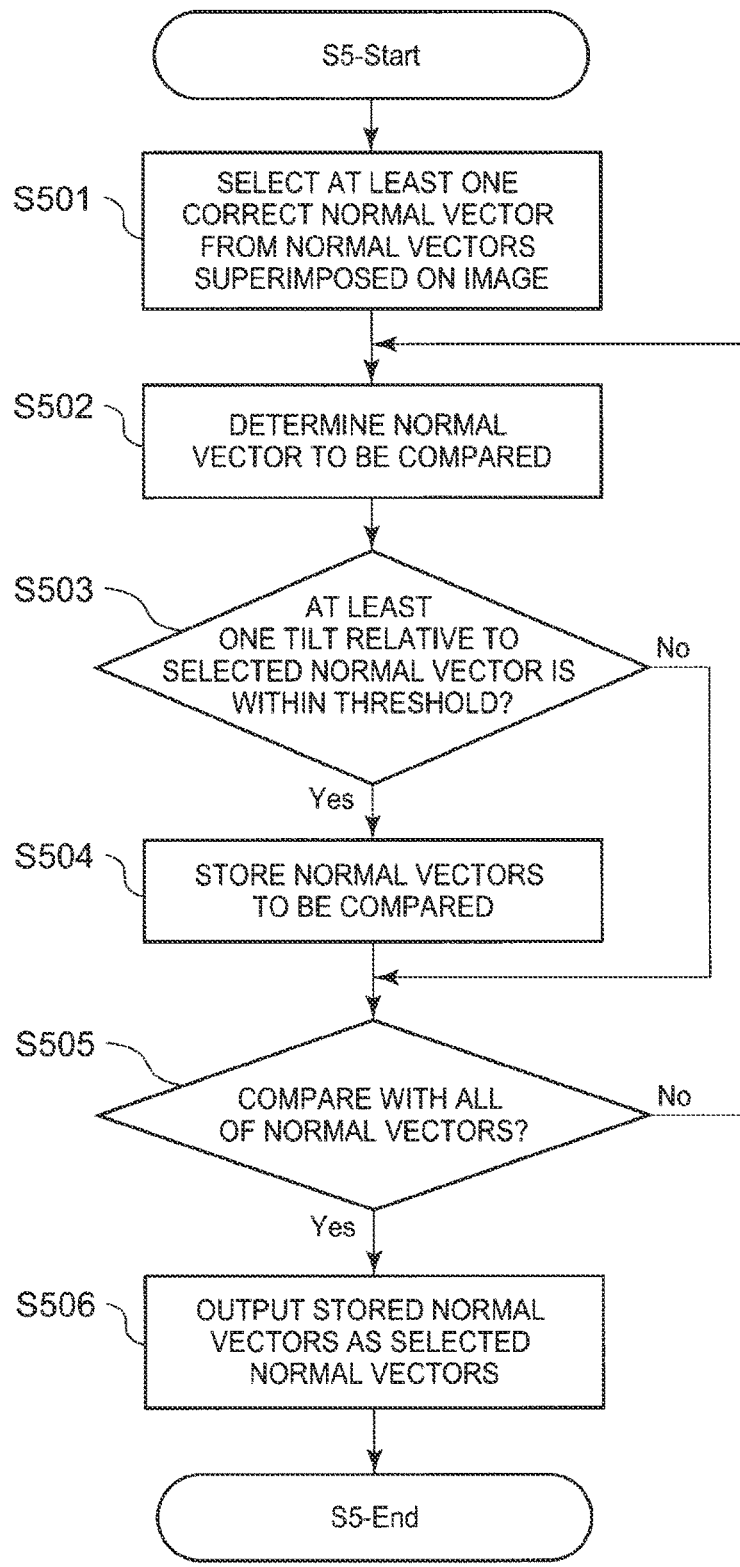
FIG. 15 It depicts a flowchart illustrating an exemplary processing of selecting a normal vector.

The processing in step S5 will be further described. FIG. 15 is a flowchart illustrating an exemplary processing of selecting a normal vector by the normal vector selection means 24. The normal vector selection means 24 receives normal vectors perpendicular to the ground from the normal vector acquisition means 21. The normal vector selection means 24 selects at least one correct normal vector from among the normal vectors superimposed on the image in response to a user's selection instruction (step S501).

The normal vector selection means 24 determines normal vectors to be compared from among all the normal vectors (step S502). The normal vector selection means 24 determines whether at least one tilt of a selected normal vector relative to some normal vectors selected as correct normal vectors is within a threshold (step S503).

When at least one tilt of the selected normal vector is within a threshold (Yes in step S503), the normal vector selection means 24 stores the normal vectors to be compared (step S504). On the other hand, when no tilt of the selected normal vector is within a threshold (No in step S503), the normal vector selection means 24 does not store the normal vectors to be compared.

Then, the normal vector selection means 24 determines whether the selected normal vector is completely compared with all the normal vectors (step S505). When a normal vector remains (No in step S505), the normal vector selection means 24 repeats the processings in step S502 to step S505.

On the other hand, when the selected normal vector is completely compared with all the normal vectors (Yes in step S505), the normal vector selection means 24 outputs the stored normal vectors as the selected normal vectors effective for camera calibration to the normal vector acquisition means 21 (step S506), and terminates the processing in step S5 in FIG. 9.

As described above, according to the second exemplary embodiment, the normal vector selection means 24 compares the tilts of user-selected normal vectors from among all the normal vectors relative to all the normal vectors acquired by the normal vector acquisition means 21. Then, the normal vector selection means 24 selects a normal vector whose tilt relative to any selected normal vector from among all the normal vectors is within a threshold as a normal vector effective for camera calibration. Therefore, in addition to the advantages of the first exemplary embodiment, the camera parameters can be highly precisely and easily estimated even when many errors are included in the normal vectors acquired by the normal vector acquisition means 21.

That is, according to the present exemplary embodiment, the normal vector selection means 24 selects a normal vector effective for camera calibration based on some selected correct normal vectors. Thus, the camera parameters can be estimated even when many errors are included in the normal vectors automatically acquired by the normal vector acquisition means 21.

Third Exemplary Embodiment

Figure 16:
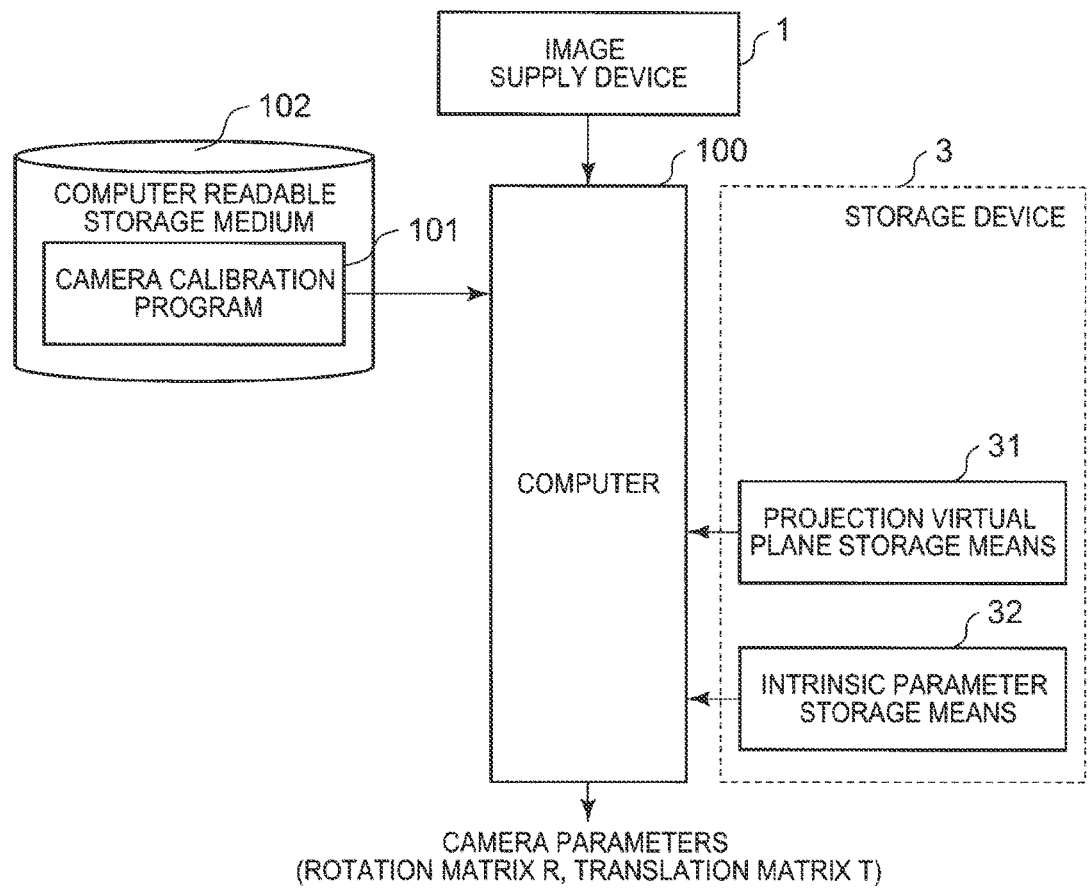
FIG. 16 It depicts a block diagram illustrating an exemplary structure of the camera calibration device according to a third exemplary embodiment of the present invention.

FIG. 16 is a block diagram illustrating an exemplary structure of the camera calibration device according to a third exemplary embodiment of the present invention. According to the present exemplary embodiment, the image supply device 1 and the storage device 3 including the projection virtual plane storage means 31 and the intrinsic parameter storage means 32, which are similar to those of the first exemplary embodiment, are connected to a computer 100. A computer readable storage medium 102 storing a camera calibration program 101 therein is connected to the computer 100.

The computer readable storage medium 102 is realized by a magnetic disk, semiconductor memory or the like. The camera calibration program 101 stored in the computer readable storage medium 102 is read by the computer 100 on startup of the computer 100, and controls the operations of the computer 100 thereby to cause the computer 100 to function as the normal vector acquisition means 21, the rotation matrix estimation means 22 and the translation matrix estimation means 23 in the data processing device 2 according to the first exemplary embodiment described above. The camera calibration program 101 causes the computer 100 to perform the processings illustrated in FIG. 9 to FIG. 12.

There has been described according to the present exemplary embodiment how the camera calibration device according to the first exemplary embodiment is realized by a computer and a program. The camera calibration device according to the second exemplary embodiment can be realized by a computer and a program in a similar manner to the present exemplary embodiment.

Figure 17:
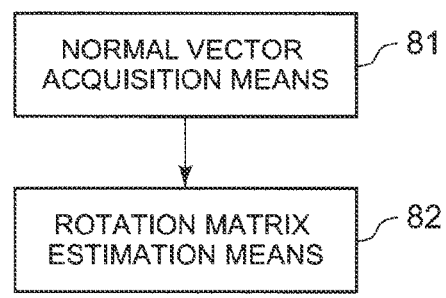
FIG. 17 It depicts a block diagram illustrating an outline of a camera calibration device according to the present invention.

An outline of the present invention will be described below. FIG. 17 is a block diagram illustrating an outline of a camera calibration device according to the present invention. The camera calibration device according to the present invention includes a normal vector acquisition means 81 (the normal vector acquisition means 21, for example) for acquiring normal vectors perpendicular to a reference horizontal plane (ground, for example) from an image of a camera to be calibrated, and a rotation matrix estimation means 82 (the rotation matrix estimation means 22, for example) for projecting the acquired normal vectors on a projection virtual plane (plane parallel to the Z axis direction of the world coordinate system, for example) perpendicular to the reference horizontal plane, and evaluating that the projected normal vectors are perpendicular to the reference horizontal plane (determining a degree of verticality, for example), thereby estimating a rotation matrix (rotation matrix R, for example) employed for camera calibration.

With the structure, the camera parameters can be highly precisely and easily estimated without installing a piece of special calibration equipment or measuring 3D coordinates of reference points employed for calibration.

Further, the camera calibration device according to the present invention may include a translation matrix estimation means (the translation matrix estimation means 23, for example) for estimating a translation matrix (translation matrix T, for example) employed for camera calibration.

Part or all of the above exemplary embodiments can be described as in the following Notes, but are not limited thereto.

(Supplementary note 1) A camera calibration device including a normal vector acquisition means which acquires normal vectors perpendicular to a reference horizontal plane from an image of a camera to be calibrated, and a rotation matrix estimation means which projects the acquired normal vectors on a projection virtual plane perpendicular to the reference horizontal plane and evaluates that the projected normal vectors are perpendicular to the reference horizontal plane thereby to estimate a rotation matrix employed for calibrating the camera.

(Supplementary note 2) The camera calibration device according to supplementary note 1 including a translation matrix estimation means which estimates a translation matrix employed for calibrating a camera, wherein the normal vector acquisition means acquires height information on the heights of the end points of at least one normal vector from among the acquired normal vectors, and the translation matrix estimation means projects one end point of a normal vector the height information of which is acquired in the real space by use of a rotation matrix estimated by the rotation matrix estimation means thereby to calculate a 3D coordinate in the real space, calculates a 3D coordinate of the other end point paired with the one end point by use of the calculated 3D coordinate and the height information, re-projects the calculated 3D coordinate of the other end point on the image by use of the rotation matrix thereby to calculate a coordinate of the other end point on the image, and estimates the translation matrix such that an error between the coordinate of the other end point re-projected on the image and the coordinate of the other end point directly acquired from the image is minimum.

(Supplementary note 3) The camera calibration device according to supplementary note 1, including a translation matrix estimation means which estimates a translation matrix employed for calibrating a camera, wherein the normal vector acquisition means acquires height information on the heights of the end points of at least one normal vector among the acquired normal vectors, and the translation matrix estimation means projects both of the end points of a normal vector the height information of which is acquired in the real space by use of a rotation matrix estimated by the rotation matrix estimation means thereby to calculate 3D coordinates in the real space, calculates 2D coordinates in which the height information is excluded from the calculated 3D coordinates of both of the end points, respectively, and estimates the translation matrix such that an error between the calculated 2D coordinates of both of the end points is minimum.

(Supplementary note 4) The camera calibration device according to supplementary note 2 or 3, including an image supply means which supplies, to the normal vector acquisition means, an animation shooting therein a motion state in which a moving medium expressed in a normal vector is moving in a shooting space where a measurement medium employed for measuring height information is arranged, and a passage state in which the moving medium passes at a position where height information can be acquired by the measurement medium, wherein the normal vector acquisition means traces the moving medium thereby to acquire a plurality of normal vectors with known height information from an animation supplied from the image supply means.

(Supplementary note 5) The camera calibration device according to any one of supplementary notes 1 to 4, wherein the rotation matrix estimation means calculates a tilt of a normal vector projected on a projection virtual plane defined as a plane parallel to the Z axis direction of a world coordinate system relative to the Z axis of the world coordinate system thereby to evaluate that the normal vector is perpendicular to a reference horizontal plane, and estimates a rotation matrix such that an error indicated by the tilt is minimum.

(Supplementary note 6) The camera calibration device according to any one of supplementary notes 1 to 4, wherein the rotation matrix estimation means calculates an error in the X axis direction between both of the end points of a normal vector projected on a projection virtual plane defined as a plane parallel to the XZ plane of a world coordinate system thereby to evaluate that the normal vector is perpendicular to a reference horizontal plane, and estimates a rotation matrix such that the error is minimum.

(Supplementary note 7) The camera calibration device according to any one of supplementary notes 1 to 6, wherein the rotation matrix estimation means restricts a rotation of a camera for shooting an image by 2D parameters of only roll rotation and pitch rotation thereby to estimate a rotation matrix, and the translation matrix estimation means assumes that the camera is on the Z axis of a world coordinate system, and restricts a position of the camera by one 1D parameter indicating a position on the Z axis of the world coordinate system thereby to estimate a translation matrix.

(Supplementary note 8) The camera calibration device according to any one of supplementary notes 1 to 7, including a normal vector selection means which compares tilts between all of normal vectors acquired by the normal vector acquisition means and user-selected correct normal vectors from among all the normal vectors, and selects a normal vector whose tilt relative to any of the selected normal vector is within a threshold as a normal vector effective for calibrating the camera.

(Supplementary note 9) A camera calibration method including: acquiring normal vectors perpendicular to a reference horizontal plane from an image of a camera to be calibrated, projecting the acquired normal vectors on a projection virtual plane perpendicular to the reference horizontal plane, and evaluating that the projected normal vectors are perpendicular to the reference horizontal plane thereby to estimate a rotation matrix employed for calibrating the camera.

(Supplementary note 10) The camera calibration method according to supplementary note 9, including: acquiring height information on the heights of the end points of at least one normal vector from among the acquired normal vectors, projecting one end point of a normal vector the height information of which is acquired into a real space by use of an estimated rotation matrix thereby to calculate a 3D coordinate in the real space, calculating a 3D coordinate of the other end point paired with the one end point by use of the calculated 3D coordinate and the height information, re-projecting the calculated 3D coordinate of the other end point back on an image by use of the rotation matrix thereby to calculate a coordinate of the other end point on the image, and estimating a translation matrix employed for calibrating a camera such that an error between the coordinate of the other end point re-projected on the image and the coordinate of the other end point directly acquired from the image is minimum.

(Supplementary note 11) The camera calibration method according to supplementary note 9, including: acquiring height information on the heights of the end points of at least one normal vector from among the acquired normal vectors, projecting both of the end points of a normal vector the height information of which is acquired into a real space by use of an estimated rotation matrix thereby to calculate 3D coordinates in the real space, calculating 2D coordinates in which the height information is excluded from the calculated 3D coordinates of both of the end points, respectively, and estimating a translation matrix employed for calibrating a camera such that an error between the calculated 2D coordinates of both of the end points is minimum.

(Supplementary note 12) A camera calibration program for causing a computer to perform a normal vector acquisition processing of acquiring normal vectors perpendicular to a reference horizontal plane from an image of a camera to be calibrated, and a rotation matrix estimation processing of projecting the acquired normal vectors on a projection virtual plane perpendicular to the reference horizontal plane and evaluating that the projected normal vectors are perpendicular to the reference horizontal plane thereby to estimate a rotation matrix employed for calibrating the camera.

(Supplementary note 13) The camera calibration program according to supplementary note 12, which causes a computer to perform a translation matrix estimation processing of estimating a translation matrix employed for calibrating a camera, to acquire height information on the heights of the end points of at least one normal vector from among the acquired normal vectors in the normal vector acquisition processing, to project one end point of a normal vector the height information of which is acquired into a real space by use of a rotation matrix estimated in the rotation matrix estimation processing thereby to calculate a 3D coordinate in the real space, to calculate a 3D coordinate of the other end point paired with the one end point by use of the calculated 3D coordinate and the height information, to re-project the calculated 3D coordinate of the other end point on an image by use of the rotation matrix thereby to calculate a coordinate of the other end point on the image, and to estimate the translation matrix such that an error between the coordinate of the other end point re-projected on the image and the coordinate of the other end point directly acquired from the image is minimum.

(Supplementary note 14) The camera calibration program according to supplementary note 12, which causes a computer to perform a translation matrix estimation processing of estimating a translation matrix employed for calibrating a camera, to acquire height information on the heights of the end points of at least one normal vector from among the acquired normal vectors, to project both of the end points of a normal vector the height information of which is acquired into a real space by use of a rotation matrix estimated in the rotation matrix estimation processing thereby to calculate 3D coordinates in the real space, to calculate 2D coordinates in which the height information is excluded from the calculated 3D coordinates of both of the end points, respectively, and to estimate the translation matrix such that an error between the calculate 2D coordinates of both of the end points is minimum.

The present invention has been described above with reference to the exemplary embodiments and examples, but the present invention is not limited to the exemplary embodiments and examples. The structure and details of the present invention may be variously changed within the scope understandable by those skilled in the art.

The present application claims the priority based on Japanese Patent Application No. 2012-010640 filed on Jan. 23, 2012, the disclosure of which is all incorporated herein by reference.

INDUSTRIAL APPLICABILITY

The present invention is suitably applied to a camera calibration device for highly precisely and easily estimating camera parameters without installing a piece of special calibration equipment or measuring 3D coordinates of reference points employed for calibration when estimating the camera parameters (rotation matrix and translation matrix) expressing a posture of a camera. Further, the present invention is suitably applied to a program for causing a computer to realize the camera calibration device.

Further, the present invention is applied to a device or the like for performing object detection, object position estimation, motion analysis and behavior analysis in a field of monitoring or field of marketing which requires real-space 3D coordinates from camera videos or stored videos.

Furthermore, the present invention is applied also to a device or the like for projecting real-space 3D coordinates on a camera video or stored video. Further, the present invention is applied also to a device or the like for recovering a cubic structure of an object displayed in a camera video or stored video. Moreover, the present invention is applied also to an input interface for inputting real-space 3D coordinates from a camera video or stored video. Furthermore, the present invention is applied also to a device or the like for processing a target portion in a camera video or stored video with a real-space 3D coordinate as a trigger or a key.

Additionally, the present invention is applied to a device or the like for automatically correcting a posture of a camera in real-time, which can be subjected to posture deviation due to camera's weight, earthquake, environmental vibration or the like after the camera is installed.

REFERENCE SIGNS LIST

1 Image supply device
2 Data processing device
3 Storage device
21 Normal vector acquisition means
22 Rotation matrix estimation means
23 Translation matrix estimation means
24 Normal vector selection means
31 Projection virtual plane storage means
32 Intrinsic parameter storage means
100 Computer
101 Camera calibration program
102 Computer readable storage medium

The invention claimed is:

1. A camera calibration device comprising:
a normal vector acquisition unit which acquires normal vectors perpendicular to a reference horizontal plane as a line segment on an image from the image of a camera to be calibrated; and
a rotation matrix estimation unit which projects the acquired normal vectors on a projection virtual plane perpendicular to the reference horizontal plane and evaluates that the projected normal vectors are perpendicular to the reference horizontal plane thereby to estimate a rotation matrix employed for calibrating the camera;
a translation matrix estimation unit which estimates a translation matrix employed for calibrating a camera,
wherein the normal vector acquisition unit acquires height information on the heights of the end points of at least one normal vector from among the acquired normal vectors, and
the translation matrix estimation unit projects one end point of a normal vector the height information of which is acquired in the real space by use of a rotation matrix estimated by the rotation matrix estimation unit thereby to calculate a 3D coordinate in the real space, calculates a 3D coordinate of the other end point paired with the one end point by use of the calculated 3D coordinate and the height information, re-projects the calculated 3D coordinate of the other end point on the image by use of the rotation matrix thereby to calculate a coordinate of the other end point on the image, and estimates the translation matrix such that an error between the coordinate of the other end point re-projected on the image and the coordinate of the other end point directly acquired from the image is minimum.

2. A camera calibration device comprising:
a normal vector acquisition unit which acquires normal vectors perpendicular to a reference horizontal plane as a line segment on an image from the image of a camera to be calibrated;
a rotation matrix estimation unit which projects the acquired normal vectors on a projection virtual plane perpendicular to the reference horizontal plane and evaluates that the projected normal vectors are perpendicular to the reference horizontal plane thereby to estimate a rotation matrix employed for calibrating the camera;
a translation matrix estimation unit which estimates a translation matrix employed for calibrating a camera,
wherein the normal vector acquisition unit acquires height information on the heights of the end points of at least one normal vector among the acquired normal vectors, and
the translation matrix estimation unit projects both of the end points of a normal vector the height information of which is acquired in the real space by use of a rotation matrix estimated by the rotation matrix estimation unit thereby to calculate 3D coordinates in the real space, calculates 2D coordinates in which the height information is excluded from the calculated 3D coordinates of both of the end points, respectively, and estimates the translation matrix such that an error between the calculated 2D coordinates of both of the end points is minimum.

3. The camera calibration device according to claim 1, comprising:
an image supply unit which supplies, to the normal vector acquisition unit, an animation shooting therein a motion state in which a moving medium expressed in a normal vector is moving in a shooting space where a measurement medium employed for measuring height information is arranged, and a passage state in which the moving medium passes at a position where height information can be acquired by the measurement medium,
wherein the normal vector acquisition unit traces the moving medium thereby to acquire a plurality of normal vectors with known height information from an animation supplied from the image supply unit.

4. The camera calibration device according to claim 1, wherein the rotation matrix estimation unit calculates a tilt of a normal vector projected on a projection virtual plane defined as a plane parallel to the Z axis direction of a world coordinate system relative to the Z axis of the world coordinate system thereby to evaluate that the normal vector is perpendicular to a reference horizontal plane, and estimates a rotation matrix such that an error indicated by the tilt is minimum.

5. The camera calibration device according to claim 1, wherein the rotation matrix estimation unit calculates an error in the X axis direction between both of the end points of a normal vector projected on a projection virtual plane defined as a plane parallel to the XZ plane of a world coordinate system thereby to evaluate that the normal vector is perpendicular to a reference horizontal plane, and estimates a rotation matrix such that the error is minimum.

6. The camera calibration device according to claim 1, wherein the rotation matrix estimation unit restricts a rotation of a camera for shooting an image by 2D parameters of only roll rotation and pitch rotation thereby to estimate a rotation matrix, and
the translation matrix estimation unit assumes that the camera is on the Z axis of a world coordinate system, and restricts a position of the camera by one 1D parameter indicating a position on the Z axis of the world coordinate system thereby to estimate a translation matrix.

7. The camera calibration device according to claim 1, comprising:

a normal vector selection unit which compares tilts between all of normal vectors acquired by the normal vector acquisition unit and user-selected correct normal vectors from among all the normal vectors, and selects a normal vector whose tilt relative to any of the selected normal vector is within a threshold as a normal vector effective for calibrating the camera.

8. A camera calibration method comprising:
acquiring normal vectors perpendicular to a reference horizontal plane as a line segment on an image from the image of a camera to be calibrated;
projecting the acquired normal vectors on a projection virtual plane perpendicular to the reference horizontal plane;
evaluating that the projected normal vectors are perpendicular to the reference horizontal plane thereby to estimate a rotation matrix employed for calibrating the camera;
estimating a translation matrix employed for calibrating a camera;
acquiring height information on the heights of the end points of at least one normal vector from among the acquired normal vectors;
projecting one end point of a normal vector the height information of which is acquired in the real space by use of a rotation matrix estimated by the rotation matrix estimation unit thereby to calculate a 3D coordinate in the real space;
calculating a 3D coordinate of the other end point paired with the one end point by use of the calculated 3D coordinate and the height information;
re-projecting the calculated 3D coordinate of the other end point on the image by use of the rotation matrix thereby to calculate a coordinate of the other end point on the image; and
estimating the translation matrix such that an error between the coordinate of the other end point re-projected on the image and the coordinate of the other end point directly acquired from the image is minimum.

9. A non-transitory computer readable information recording medium storing a camera calibration program that, when executed by a processor, performs a method for:
acquiring normal vectors perpendicular to a reference horizontal plane as a line segment on an image from the image of a camera to be calibrated;
projecting the acquired normal vectors on a projection virtual plane perpendicular to the reference horizontal plane and evaluating that the projected normal vectors are perpendicular to the reference horizontal plane thereby to estimate a rotation matrix employed for calibrating the camera;
estimating a translation matrix employed for calibrating a camera;
acquiring height information on the heights of the end points of at least one normal vector from among the acquired normal vectors;
projecting one end point of a normal vector the height information of which is acquired in the real space by use of a rotation matrix estimated by the rotation matrix estimation unit thereby to calculate a 3D coordinate in the real space;
calculating a 3D coordinate of the other end point paired with the one end point by use of the calculated 3D coordinate and the height information;
re-projecting the calculated 3D coordinate of the other end point on the image by use of the rotation matrix thereby to calculate a coordinate of the other end point on the image; and
estimating the translation matrix such that an error between the coordinate of the other end point re-projected on the image and the coordinate of the other end point directly acquired from the image is minimum.

10. The camera calibration device according to claim 2, comprising:
an image supply unit which supplies, to the normal vector acquisition unit, an animation shooting therein a motion state in which a moving medium expressed in a normal vector is moving in a shooting space where a measurement medium employed for measuring height information is arranged, and a passage state in which the moving medium passes at a position where height information can be acquired by the measurement medium,
wherein the normal vector acquisition unit traces the moving medium thereby to acquire a plurality of normal vectors with known height information from an animation supplied from the image supply unit.

11. The camera calibration device according to claim 1, wherein the rotation matrix estimation unit calculates a tilt of a normal vector projected on a projection virtual plane defined as a plane parallel to the Z axis direction of a world coordinate system relative to the Z axis of the world coordinate system thereby to evaluate that the normal vector is perpendicular to a reference horizontal plane, and estimates a rotation matrix such that an error indicated by the tilt is minimum.

12. The camera calibration device according to claim 2, wherein the rotation matrix estimation unit calculates a tilt of a normal vector projected on a projection virtual plane defined as a plane parallel to the Z axis direction of a world coordinate system relative to the Z axis of the world coordinate system thereby to evaluate that the normal vector is perpendicular to a reference horizontal plane, and estimates a rotation matrix such that an error indicated by the tilt is minimum.

13. The camera calibration device according to claim 3, wherein the rotation matrix estimation unit calculates a tilt of a normal vector projected on a projection virtual plane defined as a plane parallel to the Z axis direction of a world coordinate system relative to the Z axis of the world coordinate system thereby to evaluate that the normal vector is perpendicular to a reference horizontal plane, and estimates a rotation matrix such that an error indicated by the tilt is minimum.

14. The camera calibration device according to claim 1, wherein the rotation matrix estimation unit calculates an error in the X axis direction between both of the end points of a normal vector projected on a projection virtual plane defined as a plane parallel to the XZ plane of a world coordinate system thereby to evaluate that the normal vector is perpendicular to a reference horizontal plane, and estimates a rotation matrix such that the error is minimum.

15. The camera calibration device according to claim 2, wherein the rotation matrix estimation unit calculates an error in the X axis direction between both of the end points of a normal vector projected on a projection virtual plane defined as a plane parallel to the XZ plane of a world coordinate system thereby to evaluate that the normal vector is perpendicular to a reference horizontal plane, and estimates a rotation matrix such that the error is minimum.

16. The camera calibration device according to claim 3, wherein the rotation matrix estimation unit calculates an error in the X axis direction between both of the end points of a normal vector projected on a projection virtual plane defined as a plane parallel to the XZ plane of a world coordinate system thereby to evaluate that the normal vector is perpendicular to a reference horizontal plane, and estimates a rotation matrix such that the error is minimum.

17. A camera calibration method comprising:
acquiring normal vectors perpendicular to a reference horizontal plane as a line segment on an image from the image of a camera to be calibrated;
projecting the acquired normal vectors on a projection virtual plane perpendicular to the reference horizontal plane;
evaluating that the projected normal vectors are perpendicular to the reference horizontal plane thereby to estimate a rotation matrix employed for calibrating the camera; and
estimating a translation matrix employed for calibrating a camera;
acquiring height information on the heights of the end points of at least one normal vector among the acquired normal vectors;
projecting both of the end points of a normal vector the height information of which is acquired in the real space by use of a rotation matrix estimated by the rotation matrix estimation unit thereby to calculate 3D coordinates in the real space;
calculating 2D coordinates in which the height information is excluded from the calculated 3D coordinates of both of the end points, respectively; and
estimating the translation matrix such that an error between the calculated 2D coordinates of both of the end points is minimum.

18. A non-transitory computer readable information recording medium storing a camera calibration program that, when executed by a processor, performs a method for:
acquiring normal vectors perpendicular to a reference horizontal plane as a line segment on an image from the image of a camera to be calibrated;
projecting the acquired normal vectors on a projection virtual plane perpendicular to the reference horizontal plane and evaluating that the projected normal vectors are perpendicular to the reference horizontal plane thereby to estimate a rotation matrix employed for calibrating the camera;
estimating a translation matrix employed for calibrating a camera;
acquiring height information on the heights of the end points of at least one normal vector among the acquired normal vectors;
projecting both of the end points of a normal vector the height information of which is acquired in the real space by use of a rotation matrix estimated by the rotation matrix estimation unit thereby to calculate 3D coordinates in the real space;
calculating 2D coordinates in which the height information is excluded from the calculated 3D coordinates of both of the end points, respectively; and
estimating the translation matrix such that an error between the calculated 2D coordinates of both of the end points is minimum.

* * * * *